(12) United States Patent
Malaika

(10) Patent No.: US 11,303,875 B2
(45) Date of Patent: Apr. 12, 2022

(54) SPLIT RENDERING BETWEEN A HEAD-MOUNTED DISPLAY (HMD) AND A HOST COMPUTER

(71) Applicant: Valve Corporation, Bellevue, WA (US)

(72) Inventor: Yasser Malaika, Seattle, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 16/717,940

(22) Filed: Dec. 17, 2019

(65) Prior Publication Data

US 2021/0185294 A1 Jun. 17, 2021

(51) Int. Cl.
| | |
|---|---|
| H04N 13/194 | (2018.01) |
| H04N 13/128 | (2018.01) |
| H04N 13/161 | (2018.01) |
| G06T 7/593 | (2017.01) |
| H04N 13/183 | (2018.01) |
| G06T 7/73 | (2017.01) |

(52) U.S. Cl.
CPC .......... *H04N 13/194* (2018.05); *G06T 7/593* (2017.01); *G06T 7/73* (2017.01); *H04N 13/128* (2018.05); *H04N 13/161* (2018.05); *H04N 13/183* (2018.05)

(58) Field of Classification Search
CPC .. H04N 13/194; H04N 13/128; H04N 13/183; H04N 13/161; G06T 7/73; G06T 7/593
See application file for complete search history.

(56) References Cited

U.S. PATENT DOCUMENTS

| | | | |
|---|---|---|---|
| 2017/0003750 A1 | 1/2017 | Li | |
| 2017/0115488 A1* | 4/2017 | Ambrus | ............... G06T 19/006 |
| 2017/0323483 A1 | 11/2017 | Palmaro | |
| 2018/0286053 A1* | 10/2018 | Labbe | .................. H04N 19/597 |
| 2018/0307305 A1* | 10/2018 | Babu | ....................... G06F 3/012 |
| 2018/0336065 A1* | 11/2018 | Martin | ................. G06F 9/4843 |
| 2019/0317599 A1 | 10/2019 | Akenine-Moller et al. | |

(Continued)

FOREIGN PATENT DOCUMENTS

WO WO2019058121 A1 3/2019

OTHER PUBLICATIONS

The PCT Search Report and Written Opinion dated Mar. 22, 2021 for PCT Application No. PCT/US20/65126, 16 pages.

*Primary Examiner* — Maria E Vazquez Colon
(74) *Attorney, Agent, or Firm* — Lee & Hayes, P.C.

(57) ABSTRACT

A rendering workload for an individual frame can be split between a head-mounted display (HMD) and a host computer that is executing an application. To split a rendering workload for a frame, the HMD may send head tracking data to the host computer, and the head tracking data may be used by the host computer to generate pixel data associated with the frame and extra data in addition to the pixel data. The extra data can include, without limitation, pose data, depth data, motion vector data, and/or extra pixel data. The HMD may receive the pixel data and at least some of the extra data, determine an updated pose for the HMD, and apply reprojection adjustments to the pixel data based on the updated pose and the received extra data to obtain modified pixel data, which is used to present an image on the display panel(s) of the HMD.

20 Claims, 9 Drawing Sheets

(56) References Cited

U.S. PATENT DOCUMENTS

2019/0384408 A1* 12/2019 Iyer .................. G06F 3/017
2020/0132996 A1*  4/2020 Yokota ............. G02B 27/0101
2020/0242778 A1*  7/2020 Hefny ................ G06T 7/50

* cited by examiner

SPLIT RENDERING BETWEEN A HEAD-MOUNTED DISPLAY (HMD) AND A HOST COMPUTER

BACKGROUND

Virtual reality (VR) systems are used both within and outside of the video game industry. A conventional VR system setup includes a VR headset that is physically tethered to a host computer via a wired data connection. In this conventional setup, the host computer executes a graphics-based application, such as a video game, where most, if not all, of the graphics rendering operations are handled by the host computer, and the VR headset simply displays the pixel data received from the host computer. This setup leverages the high-computing capacity of the host computer and the low-latency of the wired connection to display high-quality imagery on a lightweight VR headset that functions much like a "thin-client" device in terms of the headset's graphics processing capabilities. However, because such VR headsets are physically connected to the host computer, the user's mobility is limited while using the VR headset. Furthermore, both setup and teardown of such a VR system is more difficult than it needs to be due to the requirement of connecting and disconnecting cables.

On the opposite end the spectrum, all-in-one (or standalone) VR headsets perform the entirety of the graphics processing operations to display imagery, without the aid of a separate machine. While standalone VR headsets provide a user with greater mobility because they do not have to be tethered to a host computer, manufacturing an all-in-one VR headset that is both comfortable and capable of rendering high-quality graphics can be challenging. For example, standalone VR headsets that are tasked with performing computationally-intensive, high-power-consuming graphics-processing operations to render high-quality graphics tend to get hot very quickly, and they also tend to be cumbersome and/or heavy, making them uncomfortable to wear for long periods of time. To alleviate these drawbacks, some standalone VR headsets trade quality for comfort by using lower-quality graphics processing components that render graphics at lower resolution, lower dynamic range, and/or with a limited set of only basic textures, which makes the graphics processing operations onboard the headset less computationally-intensive, allowing for a lighter-weight headset that does not get too hot and is therefore more comfortable to wear. However, users who wish to experience high quality graphics in VR are left dissatisfied with today's standalone VR headsets, which are unable to provide both quality and comfort.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
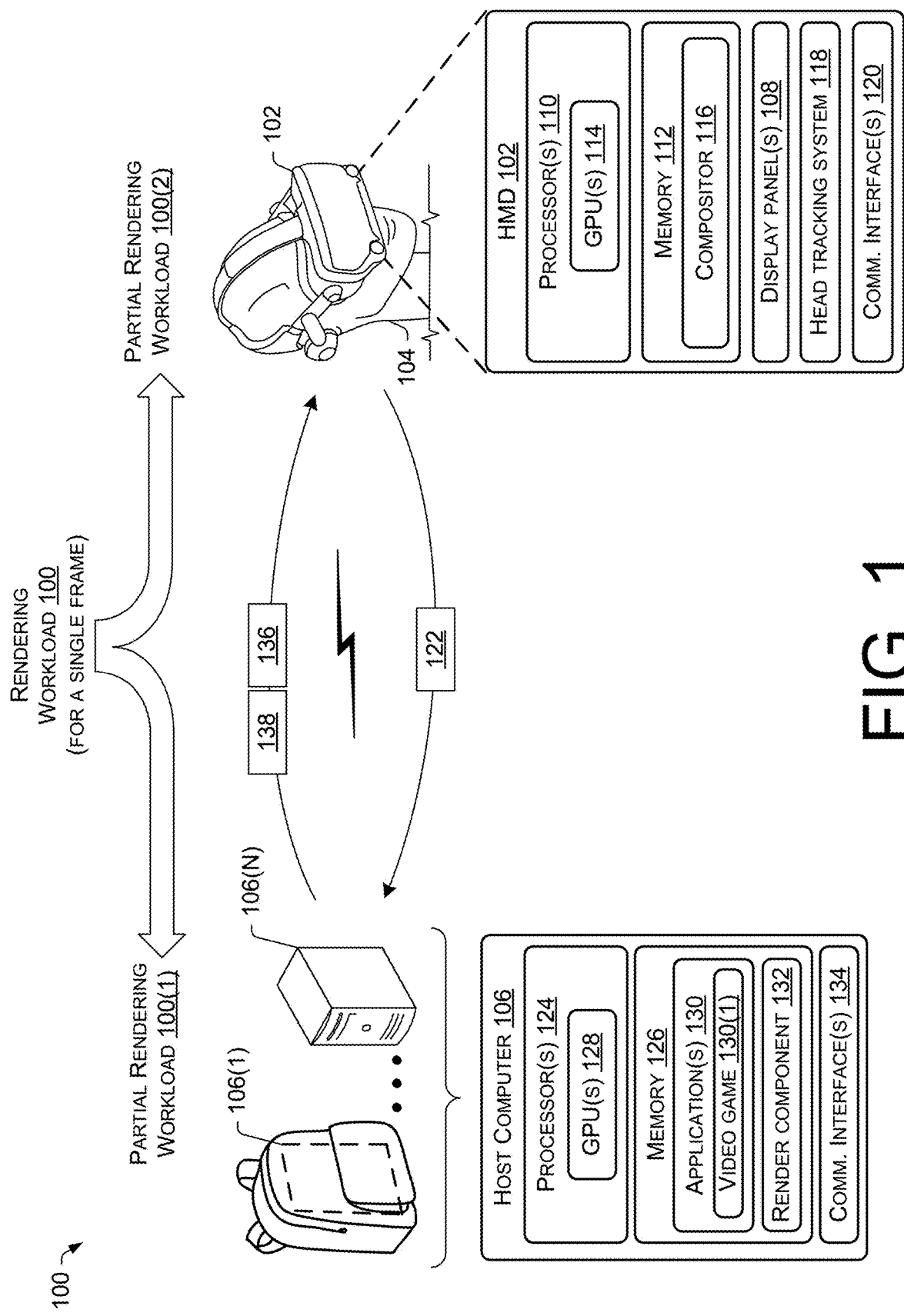
FIG. 1 is a diagram illustrating an example technique for splitting a rendering workload for a frame between a head-mounted display (HMD) and a host computer, in accordance with embodiments disclosed herein.

A head-mounted display (HMD) may be worn by a user for purposes of immersing the user in a virtual reality (VR) environment or an augmented reality (AR) environment. One or more display panels of the HMD present images based on data generated by an application (e.g., a video game). The application executes on a host computer that is communicatively coupled to the HMD, and the application generates pixel data for individual frames of a series of frames. The pixel data is sent to the HMD to present images that are viewed by a user through the optics included in the HMD, making the user perceive the images as if the user was immersed in a VR or AR environment.

Described herein are, among other things, techniques and systems for splitting a rendering workload for an individual frame between the HMD and the host computer such that the host computer performs a first portion of the rendering workload and the HMD performs a second portion of the rendering workload. For a given frame, the HMD is configured to send head tracking data to the host computer, and the host computer is configured to use the head tracking data to generate the pixel data for the frame and extra data in addition to the pixel data. The extra data can include, without limitation, pose data, depth data, motion vector data, parallax occlusion data, and/or extra pixel data. For example, the host computer may use the head tracking data to generate pose data indicative of a predicted pose that the HMD will be in at a time at which light emitting elements of the display panel(s) of the HMD will illuminate for the frame. The host computer may additionally, or alternatively, instruct the application to generate depth data and/or extra pixel data based at least in part on the pose data. The host computer may also generate motion vector data based at least in part on the head tracking data and/or movement within the scene being rendered. Some or all of this extra data may be sent from the host computer to the HMD, and the HMD may use at least some of the extra data it receives for purposes of modifying the pixel data, such as by applying re-projection adjustments to the pixel data. "Re-projection" is a technique used to compensate for slight inaccuracies in an original pose prediction of the HMD and/or to compensate for the application failing to make frame rate, which has the same effect as an original pose prediction that is slightly inaccurate. For example, a re-projected frame can be generated using pixel data from an application-rendered frame by transforming (e.g., through rotation and re-projection calculations) the application-rendered frame in a way that accounts for an updated prediction of the pose of the HMD. Accordingly, the modified pixel data obtained from applying the re-projection adjustments (and possibly other adjustments) may be used to present an image(s) on the display panel(s) of the HMD for the given frame, and this process may iterate for a series of frames.

In some embodiments, the extra data—besides the pixel data—that is generated, sent, and/or utilized for rendering frames may vary frame-to-frame. For example, the host computer may dynamically determine, for individual frames, the type and/or extent of extra data that is to be generated as part of the first portion of the rendering workload and/or the type and/or extent of the extra data that is to be sent to the HMD. Meanwhile, the HMD may dynamically determine, for individual frames, the type and/or extent of the extra data received from the host computer to utilize as part of the second portion of the rendering workload.

Splitting the rendering workload for a given frame between a host computer and a HMD allows for implementing a system where the host computer and the HMD can be wirelessly connected to each other; something that is currently impracticable with today's high-latency wireless communication protocols and HMDs that are fully-reliant on a host computer. Splitting the rendering workload, in turn, allows for providing a high-quality VR or AR experience on a HMD that is also comfortable to wear for long periods of time because the high-computing capacity of the host computer can still be leveraged in the system disclosed herein. Furthermore, the HMD disclosed herein can be, and can remain, physically untethered from the host computer, providing a user with greater mobility, as compared to a tethered HMD, in that the user is better able to walk around a space while wearing the HMD, without concern for accidentally unplugging the HMD or the like. Given user demand for high-fidelity, high-resolution VR graphics, a wireless VR system that adheres to these demands will tend to be subjected to higher latencies in data transfer over a wireless communication link due to the greater amount of data that is transferred wirelessly. This means that a pose prediction of the HMD used by the application to render a given frame is made farther in advance in the system disclosed herein, as compared to the pose prediction for a conventional physically-tethered HMD that can avail itself to the higher data transfer rate of a wired connection. A pose prediction that is made farther in advance of the illumination time for the frame means there is more error in the pose prediction, as compared to the later-in-time pose prediction for a physically-tethered HMD, which, in turn, means that the HMD disclosed herein is tasked with performing computationally-intensive graphics processing operations in order to modify the pixel data received from the host computer (e.g., to correct for errors in the pixel data received from the host computer) so that a suitable image(s) is displayed on the HMD. In general, the HMD, armed with extra data received from the host computer, is in a better position to account for a relatively-lower data transfer rate over the wireless communication link between the host computer and the HMD in order to modify the received pixel data in a way that improves the quality of the resulting image(s) presented on the display panel(s) of the HMD. In addition, the split rendering techniques and systems described herein can allow for a different rendering frequency (or frame rate) on each of the host computer and the HMD.

Accordingly, the disclosed HMD is configured to perform a portion of the rendering workload for a given frame, which allows data to be transferred wirelessly between the host computer and the HMD notwithstanding the relatively higher latency of the wireless connection, as compared to the relatively low-latency wired connection of today's HMDs. The HMD can compensate for the higher latency of the wireless communication link using graphics-processing logic onboard the HMD that is used to correct for errors in the data generated by the host computer. In addition, this onboard graphics-processing logic allows the HMD to be used as a standalone device, perhaps in limited use scenarios. For example, the HMD disclosed herein can be used in standalone mode to play video games that render more basic graphics in their imagery, thereby requiring less computationally-intensive graphics processing operations to render frames. As another example, the HMD disclosed herein can be used in standalone mode to playback movies and/or video clips on the HMD, all without relying on the host computer. When a user of the HMD disclosed herein wishes to play a video game with richer graphics, however, the user may operate the HMD in connected mode to leverage the additional graphics processing capacity of the host computer by connecting the HMD thereto, either over a wired or wireless communication link. A wired communication link may still be utilized by users who wish to play video games with richer graphics for long periods of time by leveraging the additional power capacity of the host computer (e.g., so the HMD does not run out of battery power). As compared to today's all-in-one systems, for example, a user can benefit from a high-fidelity graphics experience that is provided by a connected host computer along with the increased mobility that is enabled by virtue of an available wireless connection between the host computer and the HMD.

Also disclosed herein are non-transitory computer-readable media storing computer-executable instructions to implement the techniques and processes disclosed herein. Although the techniques and systems disclosed herein are discussed, by way of example, in the context of video game applications, and specifically VR gaming applications, it is to be appreciated that the techniques and systems described herein may provide benefits with other applications, including, without limitation, non-VR applications (e.g., AR applications), and/or non-gaming applications, such as industrial machine applications, defense applications, robotics applications, and the like.

FIG. 1 is a diagram illustrating an example technique for splitting a rendering workload 100 for a frame between a head-mounted display (HMD) and a host computer. FIG. 1 depicts a head-mounted display (HMD) 102 worn by a user 104, as well as a host computer(s) 106. FIG. 1 depicts example implementations of a host computer 106 in the form of a laptop 106(1) carried in a backpack, for example, or a personal computer (PC) 106(N), which may be situated in the user's 104 household, for example. It is to be appreciated, however, that these exemplary types of host computers 106 are non-limiting to the present disclosure. For example, the host computer 106 can be implemented as any type and/or any number of computing devices, including, without limitation, a PC, a laptop computer, a desktop computer, a portable digital assistant (PDA), a mobile phone, tablet computer, a set-top box, a game console, a server computer, a wearable computer (e.g., a smart watch, etc.), or any other electronic device that can transmit/receive data. The host computer 106 may be collocated in the same environment as the HMD 102, such as a household of the user 104 wearing the HMD 102. Alternatively, the host computer 106 may be remotely located with respect to the HMD 102, such as a host computer 106 in the form of a server computer that is located in a remote geographical location with respect to the geographical location of the HMD 102. In a remote host computer 106 implementation, the host computer 106 may be communicatively coupled to the HMD 102 via a wide-area network, such as the Internet. In a local host computer 106 implementation, the host computer 106 may be collocated in an environment (e.g., a household) with the HMD 102, whereby the host computer 106 and the HMD 102 may be communicatively coupled together either directly or over a local area network (LAN) via intermediary network devices.

As shown in FIG. 1, for a given frame, the host computer 106 is configured to perform a first partial rendering workload 100(1) (e.g., a first portion of the rendering workload 100 for a given frame), and the HMD 102 is configured to perform a second partial rendering workload 100(2) (e.g., a second portion of the rendering workload 100 for the given frame). In this manner, the HMD 102 and the host computer 106 are communicatively coupled together and are configured to work together in a collaborative fashion to render a given frame by generating pixel data that is ultimately used to present a corresponding image(s) on a display panel(s) 108 of the HMD 102.

The HMD 102 in the example of FIG. 1 may include a single display panel 108 or multiple display panels 108, such as a left display panel and a right display panel of a stereo pair of display panels. The one or more display panels 108 of the HMD 102 may be used to present a series of image frames (herein referred to as "frames") that are viewable by the user 104 wearing the HMD 102. It is to be appreciated that the HMD 102 may include any number of display panels 108 (e.g., more than two display panels, a pair of display panels, or a single display panel). Hence, the terminology "display panel," as used in the singular herein, may refer to either display panel 108 of a pair of display panels of a two-panel HMD 102, or it may refer to a single display panel 108 of a HMD 102 with any number of display panels (e.g., a single-panel HMD 102 or a multi-panel HMD 102). In a two-panel HMD 102, a stereo frame buffer may render, for instance, 2160×1200 pixels on both display panels of the HMD 102 (e.g., 1080×1200 pixels per display panel).

The display panel(s) 108 of the HMD 102 may utilize any suitable type of display technology, such as an emissive display that utilizes light emitting elements (e.g., light emitting diodes (LEDs)) to emit light during presentation of frames on the display panel(s) 108. As an example, display panel(s) 108 of the HMD 102 may comprise liquid crystal displays (LCDs), organic light emitting diode (OLED) displays, inorganic light emitting diode (ILED) displays, or any other suitable type of display technology for HMD applications.

The display panel(s) 108 of the HMD 102 may operate at any suitable refresh rate, such as a 90 Hertz (Hz) refresh rate, which can be a fixed refresh rate or a variable refresh rate that dynamically varies over a range of refresh rates. The "refresh rate" of a display is the number of times per second the display redraws the screen. The number of frames displayed per second may be limited by the refresh rate of the display, if using a fixed refresh rate. Thus, a series of frames may be processed (e.g., rendered) and displayed as images on the display such that a single frame of the series of frames is displayed with every screen refresh. That is, in order to present a series of images on the display panel(s) 108, the display panel(s) 108 may transition from frame-to-frame, in the series of frames, at the refresh rate of the display, illuminating the pixels at every screen refresh. In some embodiments, the frame rate can be throttled and/or the application can fail to hit the target frame rate, and phantom frames (based on re-projection) can be inserted between application-rendered frames.

The display system of the HMD 102 may implement any suitable type of display driving scheme, such as a global flashing type of display driving scheme, a rolling band type of display driving scheme, or any other suitable type of display driving scheme. In a global flashing type of display driving scheme, the array of light emitting elements of the display illuminate simultaneously at every screen refresh, thereby flashing globally at the refresh rate. In a rolling band type of display driving scheme, individual subsets of the light emitting elements of the display can be illuminated independently and sequentially in a rolling band of illumination during an illumination time period. These types of display driving schemes may be enabled by the light emitting elements being individually addressable. If the array of pixels and the array of light emitting elements on the display panel(s) 108 are arranged in rows and columns (but not necessarily with a one-pixel per one-light emitting element correspondence), individual rows and/or individual columns of light emitting elements may be addressed in sequence, and/or individual groups of contiguous rows and/or individual groups of contiguous columns of light emitting elements may be addressed in sequence for a rolling band type of display driving scheme.

In general, as used herein, "illuminating a pixel" means illuminating the light emitting element that corresponds to that pixel. For example, a LCD illuminates a light emitting element of a backlight to illuminate the corresponding pixel(s) of the display. Furthermore, as used herein, a "subset of pixels" may comprise an individual pixel or multiple pixels (e.g., a group of pixels). In order to drive the display panel(s) 108, the HMD 102 may include, among other things, a display controller(s), display driver circuitry, and similar electronics for driving the display panel(s) 108. Display driver circuitry may be coupled to the array of light emitting elements of the display panel(s) 108 via conductive paths, such as metal traces, on a flexible printed circuit. In an example, a display controller(s) may be communicatively coupled to the display driver circuitry and configured to provide signals, information, and/or data to the display driver circuitry. The signals, information, and/or data received by the display driver circuitry may cause the display driver circuitry to illuminate the light emitting elements in a particular way. That is, the display controller(s) may determine which light emitting element(s) is/are to be illuminated, when the element(s) is/are to illuminate, and the level of light output that is to be emitted by the light emitting element(s), and may communicate the appropriate signals, information, and/or data to the display driver circuitry in order to accomplish that objective.

In the illustrated implementation, the HMD 102 includes one or more processors 110 and memory 112 (e.g., computer-readable media 112). In some implementations, the processors(s) 110 may include a central processing unit (CPU)(s), a graphics processing unit (GPU)(s) 114, both CPU(s) and GPU(s) 114, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 may possess its own local memory, which also may store program modules, program data, and/or one or more operating systems.

The memory 112 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 may be implemented as computer-readable storage media ("CRSM"), which may be any available physical media accessible by the processor(s) 110 to execute instructions stored on the memory 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 110.

In general, the HMD 102 may include logic (e.g., software, hardware, and/or firmware, etc.) that is configured to implement the techniques, functionality, and/or operations described herein. The computer-readable media 112 can include various modules, such as instruction, datastores, and so forth, which may be configured to execute on the processor(s) 110 for carrying out the techniques, functionality, and/or operations described herein. An example functional module in the form of a compositor 116 is shown as being stored in the computer-readable media 112 and executable on the processor(s) 110, although the same functionality may alternatively be implemented in hardware, firmware, or as a system on a chip (SOC), and/or other logic. Furthermore, additional or different functional modules may be stored in the computer-readable media 112 and executable on the processor(s) 110. The compositor 116 is configured to modify pixel data received from the host computer 106 as part of the second partial rendering workload 100(2), and to output the modified pixel data to a frame buffer (e.g., a stereo frame buffer) so that a corresponding image(s) can be presented on the display panel(s) 108 of the HMD 102.

The HMD 102 may further include a head tracking system 118 and a communications interface(s) 120. The head tracking system 118 may leverage one or more sensors (e.g., infrared (IR) light sensors mounted on the HIM 102) and one or more tracking beacon(s) (e.g., IR light emitters collocated in the environment with the HMD 102) to track head motion or movement, including head rotation, of the user 104. This example head tracking system 118 is non-limiting, and other types of head tracking systems 118 (e.g., camera-based, inertial measurement unit (IMU)-based, etc.) can be utilized. The head tracking system 118 is configured to generate head tracking data 122, which can be sent, via the communications interface(s) 120 to the host computer 106 during runtime, as frames are being rendered.

The communications interface(s) 120 of the HMD 102 may include wired and/or wireless components (e.g., chips, ports, etc.) to facilitate wired and/or wireless data transmission/reception to/from the host computer 106, either directly or via one or more intermediate devices, such as a wireless access point (WAP). For example, the communications interface(s) 120 may include a wireless unit coupled to an antenna to facilitate a wireless connection with the host computer 106 and/or another device(s). Such a wireless unit may implement one or more of various wireless technologies, such as Wi-Fi, Bluetooth, radio frequency (RF), and so on. The communications interface(s) 120 may further include one or more physical ports to facilitate a wired connection with the host computer 106 and/or another device(s) (e.g., a plug-in network device that communicates with other wireless networks).

In the illustrated implementation, the host computer 106 includes one or more processors 124 and memory 126 (e.g., computer-readable media 126). In some implementations, the processors(s) 124 may include a CPU(s), a GPU(s) 128, both CPU(s) and GPU(s) 128, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include FPGAs, ASICs, ASSPs, SOCs, CPLDs, etc. Additionally, each of the processor(s) 124 may possess its own local memory, which also may store program modules, program data, and/or one or more operating systems.

The memory 126 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, DVD or other optical storage, magnetic cassettes, magnetic tape, magnetic disk storage or other magnetic storage devices, RAID storage systems, or any other medium which can be used to store the desired information and which can be accessed by a computing device. The memory 126 may be implemented as CRSM, which may be any available physical media accessible by the processor(s) 124 to execute instructions stored on the memory 126. In one basic implementation, CRSM may include RAM and Flash memory. In other implementations, CRSM may include, but is not limited to, ROM, EEPROM, or any other tangible medium which can be used to store the desired information and which can be accessed by the processor(s) 124.

In general, the host computer 106 may include logic (e.g., software, hardware, and/or firmware, etc.) that is configured to implement the techniques, functionality, and/or operations described herein. The computer-readable media 126 can include various modules, such as instruction, datastores, and so forth, which may be configured to execute on the processor(s) 124 for carrying out the techniques, functionality, and/or operations described herein. Example functional modules in the form of applications 130, such as a video game 130(1), and a render component 132 are shown as being stored in the computer-readable media 126 and executable on the processor(s) 124. In some embodiments, the functionality of the render component 132 may alternatively be implemented in hardware, firmware, or as a system on a chip (SOC), and/or other logic. Furthermore, additional or different functional modules may be stored in the computer-readable media 126 and executable on the processor(s) 124.

The host computer 106 may further include a communications interface(s) 134, which may include wired and/or wireless components (e.g., chips, ports, etc.) to facilitate wired and/or wireless data transmission/reception to/from the HMD 102, either directly or via one or more intermediate devices, such as a WAP. For example, the communications interface(s) 134 may include a wireless unit coupled to an antenna to facilitate a wireless connection with the HMD 102 and/or another device(s). Such a wireless unit may implement one or more of various wireless technologies, such as Wi-Fi, Bluetooth, RF, and so on. The communications interface(s) 134 may further include one or more physical ports to facilitate a wired connection with the HMD 102 and/or another device(s) (e.g., a plug-in network device that communicates with other wireless networks).

It is to be appreciated that the HMD 102 may represent a VR headset for use in VR systems, such as for use with a VR gaming system, in which case the video game 130(1) may represent a VR video game 130(1). However, the HMD 102 may additionally, or alternatively, be implemented as an AR headset for use in AR applications, or a headset that is usable for VR and/or AR applications that are not game-related (e.g., industrial applications). In AR, a user 104 sees virtual objects overlaid on a real-world environment, whereas, in VR, the user 104 does not typically see a real-world environment, but is fully immersed in a virtual environment, as perceived via the display panel(s) 108 and the optics (e.g., lenses) of the HMD 102. It is to be appreciated that, in some VR systems, pass-through imagery of the real-world environment of the user 104 may be displayed in conjunction with virtual imagery to create an augmented VR environment in a VR system, whereby the VR environment is augmented with real-world imagery (e.g., overlaid on a virtual world). Examples described herein pertain primarily to a VR-based HMD 102, but it is to be appreciated that the HMD 102 is not limited to implementation in VR applications.

In general, the application(s) 130 executing on the host computer 106 can be a graphics-based application(s) 130 (e.g., a video game 130(1)). An application 130 is configured to generate pixel data for a series of frames, and the pixel data is ultimately used to present corresponding images on the display panel(s) 108 of the HMD 102. During runtime, for a given frame, the render component 132 may determine a predicted "illumination time" for the frame. This predicted "illumination time" for the frame represents a time at which light emitting elements of the display panel(s) 108 of the HMD 102 will illuminate for the frame. This prediction can account for, among other things, the inherent latency of a wireless communication link between the host computer 106 and the HMD 102, as well as a predicted render time and/or a known scan-out time of the pixels from the frame buffer(s). In other words, the prediction may be different for a wireless communication link than it is for a wired communication link. For instance, the render component 132 may, for a wired communication link, predict an illumination time that is a first amount of time in the future (e.g., about 22 milliseconds in the future), whereas the render component 132 may, for a wireless communication link, predict an illumination time that is a second, greater amount of time in the future (e.g., about 44 milliseconds in the future), due to the inherent differences in latency when transferring data over a wired connection verses a wireless connection.

The host computer 106 may also receive, from the HMD 102, the head tracking data 122 (e.g., first head tracking data 122) generated by the head tracking system 118 of the HMD 102. This head tracking data 122 may be generated and/or sent at any suitable frequency, such as a frequency corresponding to the target frame rate and/or the refresh rate of the HMD 102, or a different (e.g., faster) frequency, such as 1000 Hz (or 1 sensor reading every 1 millisecond). The render component 132 is configured to determine a predicted pose that the HMD 102 will be in at the predicted illumination time based at least in part on the head tracking data 122. The render component 132 may then provide pose data indicative of the predicted pose to the executing application 130 for rendering the frame (e.g., generating pixel data for the frame) based on the predicted pose, and the render component 132 may obtain, from the application 130, pixel data 136 associated with the frame. This pixel data 136 may correspond to an array of pixels of the display panel(s) 108 of the HMD 102. For example, the pixel data 136 output by the application 130 based on the pose data may include a two-dimensional array of per-pixel values (e.g., color values) for the array of pixels on the display panel(s) 108 of the HMD 102. In an illustrative example, a stereo pair of display panels 108 may include an array of 2160×1200 pixels on both display panels of the HMD 102 (e.g., 1080×1200 pixels per display panel). In this illustrative example, the pixel data 136 may include 2160×1200 pixel values (or 2,592,000 pixel values). In some embodiments, the pixel data 136 may include data for each pixel that is represented by a single set of color and alpha values (e.g., one color value for a red channel, one color value for a green channel, one color value for a blue channel, and one or more values for one or more alpha channels).

Logic of the host computer 106 may also generate extra data 138 besides (or, in addition to) the pixel data 136, and at least some of this extra data 138 may be sent to the HMD 102 to aid the HMD 102 in the second partial rendering workload 100(2). For example, the extra data 138 can be packaged with the pixel data 136 and sent to the HMD 102, and at least some of the extra data 138 can be used by logic of the HMD 102 to modify the pixel data 136 for purposes of presenting an image(s) corresponding to the frame on the display panel(s) 108 of the HMD 102. The extra data 138 can include, without limitation, the pose data generated by the render component 132, depth data, motion vector data, parallax occlusion data, and/or extra pixel data. For example, in providing the pose data to the executing application 130 for rendering the frame, the render component 132 may further instruct the application 130 to generate depth data (e.g., Z-buffer data) for the frame and/or extra pixel data (sometimes referred to herein as "out-of-bounds pixel data" or "additional pixel data"), and, in response, the render component 132 may obtain, from the application 130, the depth data and/or the extra pixel data associated with the frame. Additionally, or alternatively, the render component 132 may generate motion vector data based at least in part on the head tracking data 122 received from the HMD 102. For example, motion vector data can be generated based on a comparison of head tracking data generated at two different points in time (e.g., a comparison of head tracking data separated by a few milliseconds). Logic of the HMD 102 (e.g., the compositor 116) can utilize some or all of the extra data 138 for purposes of modifying the pixel data 136 to correct for errors in the pose prediction made ahead of time by the render component 132, which accounted for the inherent latency of the wireless connection between the host computer 106 and the HMD 102. For example, the compositor 116 may apply re-projection adjustments based at least in part on the extra data 138 received from the host computer 106. Other adjustments made by the compositor 116 as part of the second partial rendering workload 100(2) may include, without limitation, adjustments for geometric distortion, chromatic aberration, re-projection, and the like. Ways in which the extra data 138 can be utilized as part of the second partial rendering workload 100(2) are described in more detail below with reference to the following figures.

Figure 2:
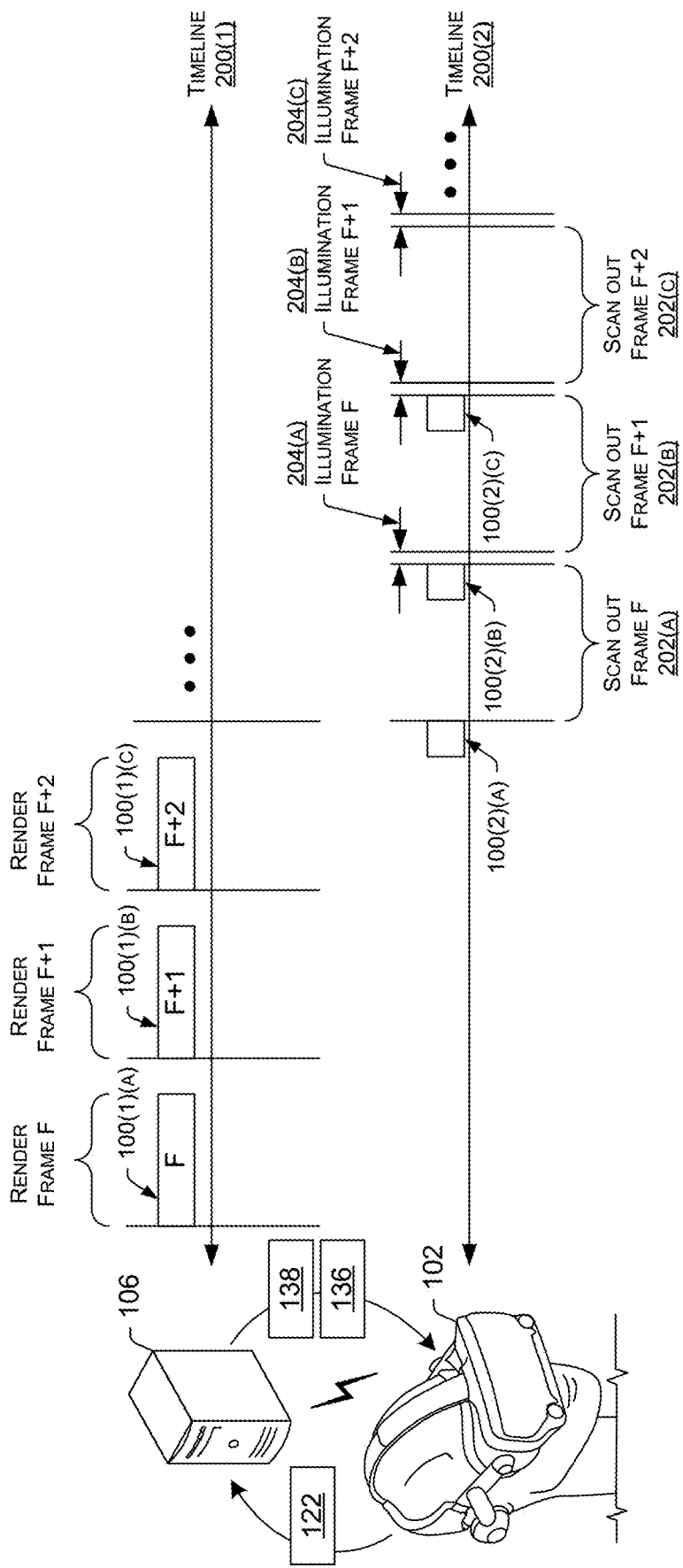
FIG. 2 is a diagram illustrating two example timelines showing respective rendering workloads for individual frames, the respective rendering workloads being split between a host computer and a HMD, in accordance with embodiments disclosed herein.

FIG. 2 is a diagram illustrating two example timelines 200(1) and 200(2) showing respective rendering workloads for individual frames, the respective rendering workloads being split between a host computer 106 and a HMD 102, in accordance with embodiments disclosed herein. The example of FIG. 2 depicts three example frames—frame "F", frame "F+1", and frame "F+2"—with respect to the first timeline 200(1) associated with the host computer 106. This first timeline 200(1) illustrates how the frames can be rendered in series by an executing application 130 on the host computer 106 using a GPU(s) 128 of the host computer 106. Here, the application 130 renders frame F as part of first partial rendering workload 100(1)(a), then frame F+1 as part of a second partial rendering workload 100(1)(b), and then frame F+2 as part of a third partial rendering workload 100(1)(c), in sequence, from left to right on the first timeline 200(1). The ellipses on the first timeline 200(1) indicate that this may continue for any number of frames as the application 130 continues to execute. The first timeline 200(1) also implies, by the vertical lines oriented orthogonally to the horizontal timeline 200(1), that the application 130 is targeting a target frame rate (e.g., a frame rate of 90 Hz where the vertical lines would be separated by about 11.11 milliseconds). In the example of FIG. 2, the application 130 executing on the host computer 106 happens to be hitting the target frame rate over the series of three example frames, but this may not always be the case, as the application 130 may, in some instances (e.g., for scenes with a high number of moving objects or complex textures), take longer than the allotted time to render a given frame 202. This scenario is sometimes referred to as the application 130 failing to hit the target frame rate.

The second timeline 200(2) in FIG. 2, which is associated with the HMD 102, shows the partial rendering workloads 100(2)(a), 100(2)(b), and 100(2)(c) of the compositor 116 of the HMD 102 for the individual frames. An individual rendering workload 100(2) of the HMD's 102 compositor 116 for a given frame may represent adjustments that are applied to the pixel data 136 generated by the application 130 executing on the host computer 106 before a final image(s) is presented on the display panel(s) 108 of the HMD 102. Such adjustments may include, without limitation, adjustments for geometric distortion, chromatic aberration, re-projection, and the like, which are applied to the pixel data 136 received from the host computer 106 before rendering a final image(s) on the HMD 102. At least some of these adjustments may utilize the extra data 138 received from the host computer 106, such as the pose data, depth data, extra pixel data, parallax occlusion data, and/or motion vector data, as described herein. Accordingly, the frames that are shown in FIG. 2 are meant to represent "actual" frames in the sense that they are output from the application 130, which may represent a video game application 130(1), or any other type of graphics-based application. By contrast, if the application 130 failed to hit the target frame rate for a given frame, or if the frame rate was throttled to a lower rate than the refresh rate of the display panel(s) 108 of the HMD 102, the compositor 116 of the HMD 102 may use the previously-received pixel data 136 for a preceding frame to generate a "phantom" frame (e.g., using re-projection) based on the pose prediction of the preceding frame and an updated pose prediction made by the HMD 102. In any case, the result of the partial rendering workloads 100(2) is the generation of modified pixel data that may be output to a frame buffer (e.g., a stereo frame buffer). This distinction between an "actual" frame and a "phantom" frame is not meant to imply that an actual frame is not adjusted on the HMD 102, and, in this sense, the frames generated on the HMD side are all effectively synthesized (i.e., not the same as the original frames output by the application 130 executing on the host computer 106).

The second timeline 200(2) of FIG. 2 also shows a scan-out time 202(a), 202(b), and 202(c) for each frame, as well as an illumination time 204(a), 204(b), and 204(c) for each frame. During the scan-out time 202 for a given frame, subsets of pixel values (of the modified pixel data) are scanned out to the display panel(s) 108 via a display port (e.g., a high-definition multimedia interface (HDMI)), and during the illumination time 204 for the given frame, the light emitting elements of the display panel(s) 108 are illuminated to cause the pixels of the display panel(s) 108 to illuminate. FIG. 2 illustrates an example of a global flashing type of display driving scheme, which may be used with LCD panels to simultaneously emit light from the light emitting elements of the display panel(s) 108 at the refresh rate of the HMD 102. In an illustrative example, if the HMD 102 is operating at a 90 Hz refresh rate, the illumination time 204 for each frame may be separated by roughly 11.11 milliseconds.

It is to be appreciated that, although FIG. 2 depicts that the respective rendering cycles of the host computer 106 and the HMD 102 appear to be synchronized (which they can be), the techniques and systems described herein do not require synchronization of frames between the two devices. In general, the compositor 116 of the HMD 102 may start its rendering workload 100(2) for a given frame as soon as the data (e.g., the pixel data 136 and the extra data 138) is received from the host computer 106, and/or as soon as the HMD 102 determines that the application 130 of the host computer 106 may have missed a frame or that packets may have been dropped in transit, etc. Due to varying conditions of the wireless communications link, the processing loads on the respective devices, and/or other factors, the respective rendering cycles of the host computer 106 and the HMD 102 may at times be out-of-synch/unsynchronized relative to each other. Accordingly, while the host computer 106 and the HMD 102 are configured to work together in a collaborative fashion by splitting the rendering workload for a given frame into partial workloads performed on the respective devices, one can appreciated that the devices may operate independently of one another to perform their respective portions of the workload.

The processes described herein are illustrated as a collection of blocks in a logical flow graph, which represent a sequence of operations that can be implemented in hardware, software, firmware, or a combination thereof (i.e., logic). In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
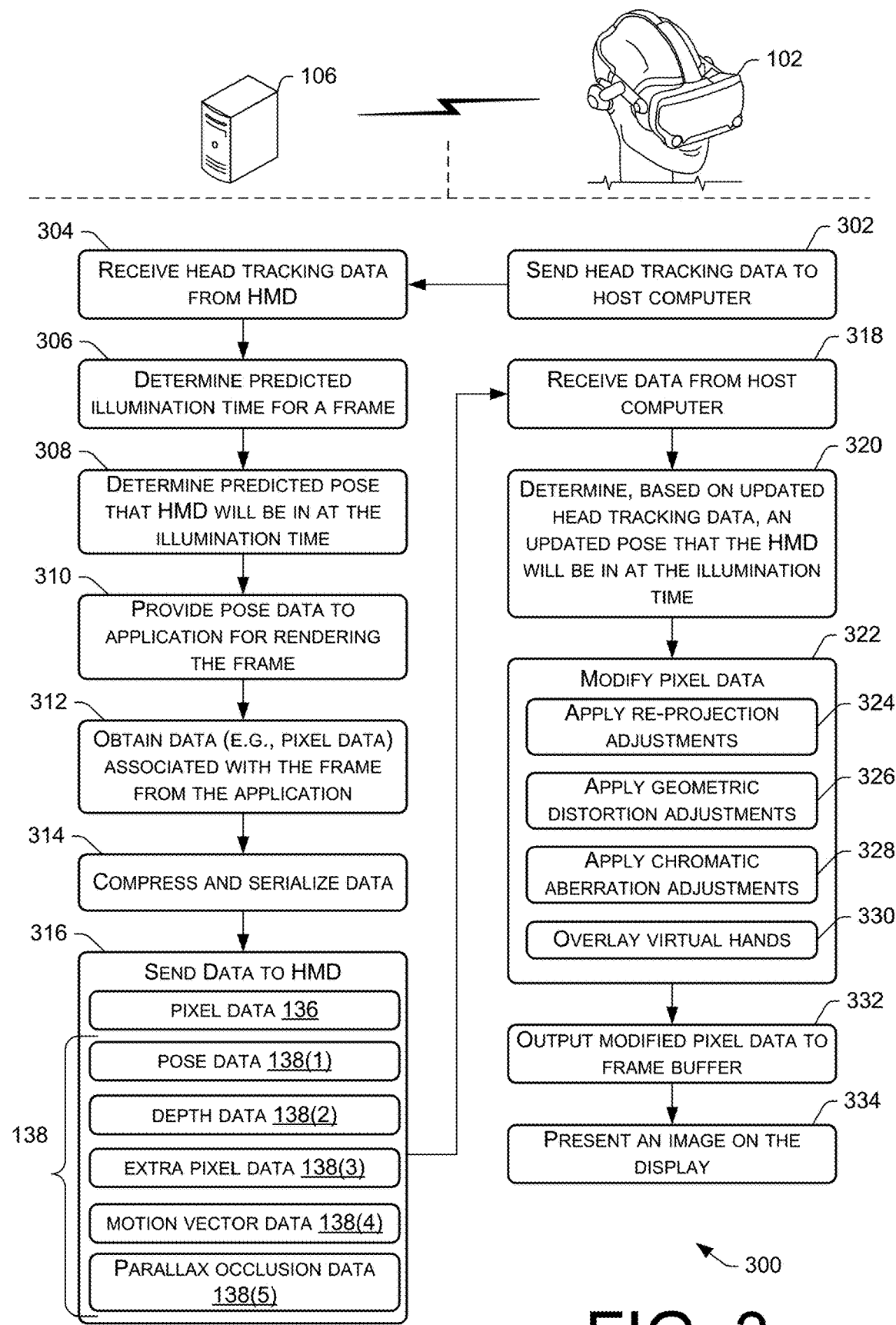
FIG. 3 illustrates a flow diagram of an example process for rendering a frame by splitting the rendering workload for the frame between a HMD and a host computer, in accordance with embodiments disclosed herein.

FIG. 3 illustrates a flow diagram of an example process 300 for rendering a frame by splitting the rendering workload 100 for the frame between a HMD 102 and a host computer 106, in accordance with embodiments disclosed herein. For discussion purposes, the process 300 is described with reference to the previous figures.

At 302, a HMD 102 may send, to a host computer 106 that is communicatively coupled to the HMD 102, first head tracking data 122 generated by a head tracking system 118 of the HMD 102. The way in which the host computer 106 and the HMD 102 are communicatively coupled can vary by implementation. For an implementation where the host computer 106 is wirelessly coupled to the HMD 102, the first head tracking data 122 may be sent wirelessly from the HMD 102 to the host computer 106 (e.g., using WiFi, Bluetooth, or any suitable wireless communication protocol, including proprietary protocols). For an implementation where the host computer 106 is coupled to the HMD 102 via a wired connection (e.g., a data cable), the first head tracking data 122 may be sent from the HMD 102 to the host computer 106 over a wired connection, such as a data cable. Furthermore, if the host computer 106 is located at a remote geographical location with respect to the HMD 102, the first head tracking data 122 may be sent at block 302 from the HMD 102 to the host computer 106 over a wide-area network, such as the Internet.

At 304, the host computer 106 may receive, from the HMD 102, the first head tracking data 122. As mentioned with respect to block 302, the first head tracking data 122 may be received in various ways, depending on the implementation, such as wirelessly, over a wired connection, via a wide-area network, etc. At this point in time when the host computer 106 receives the first head tracking data 122, the host computer 106 may be executing an application 130 thereon, such as a video game 130(1), that is tasked with rendering a first frame of a series of frames for purposes of creating visual video game content to be displayed on the HMD 102.

At 306, logic of the host computer 106 (e.g., the render component 132) may determining a predicted illumination time representing a time at which light emitting elements of the display panel(s) 108 of the HMD 102 will illuminate for the first frame. That is, the logic of the host computer 106 may determine a time when the photons associated with the imagery that is presented for the first frame will actually reach the user's 104 eye(s). This predicted illumination time is a time in the future (e.g., about 44 milliseconds in the future) because the render component 132 has to account for the time it takes for the application 130 to generate the pixel data 136, the time it takes the pixel data 136 to be transmitted from the host computer 106 to the HMD 102, and the time it takes for the pixel data 136 to be modified and scanned out on the HMD 102 before a corresponding image is ultimately presented on the display panel(s) 108 of the HMD 102.

At 308, the logic of the host computer 106 (e.g., the render component 132) may determine, based at least in part on the first head tracking data 122 received at block 304, a predicted pose that the HMD 102 will be in at the predicted illumination time that was determined at block 306. For example, the head tracking system 118 of the HMD 102 may be configured to track up to six degrees of freedom of the HMD 102 (e.g., 3D position, roll, pitch, and yaw), which can be sent as head tracking data 122 to the host computer 106 to determine a predicted pose of the HMD 102 (e.g., accounting for predicted head movement resulting in a future pose of the HMD 102).

At 310, the logic of the host computer 106 (e.g., the render component 132) may provide, to the application 130 executing on the host computer 106 for purposes of rendering the first frame, pose data indicative of the predicted pose, which was determined at block 308. For instance, the application 130 may call a function to receive pose data from the render component 132, and the render component 132 may provide the application 106 with the requested pose data (predicted to the target illumination time for the first frame, and predicted based at least in part on the head tracking data 122 received from the HMD 102) so that the application 130 can render the first frame according to the pose data, which corresponds to a virtual camera pose used to render the scene. In some embodiments, the render component 132 may instruct the application 130 to generate not only the pixel data 136 for the frame, but extra data, such as depth data and/or extra pixel data.

At 312, the logic of the host computer 106 (e.g., the render component 132) may obtaining (or receive), from the application 130, data (e.g., pixel data 136) associated with the first frame. The pixel data 136 may include pixel values, as described herein, for individual pixels in the array of pixels of the display panel(s) 108 of the HMD 102. As mentioned, in embodiments where the render component 132 requested the application 130 to generate extra data 138 in addition to the pixel data 136, the render component 132, at block 312 may obtain (or receive) extra data 138, such as depth data (e.g., Z-buffer data) and/or extra pixel data that includes extra pixel values outside of the boundary of the array of pixels of the display panel(s) 108. For example, if the display panel(s) 108 have an array of 2160×1200 pixels, the pixel data 136 may correspond to the pixel values in the 2160×1200 array of pixels, while extra pixel data may correspond to pixels that are outside of the boundary of the 2160×1200 array. Accordingly, the pixel data 136 and the extra pixel data may constitute a larger number of pixel values, such as a larger array of, say, 2400×1400 pixels, as an example.

At 314, the logic of the host computer 106 (e.g., the render component 132) may compress and/or serialize data that is to be sent to the HMD 102 for purposes of rendering imagery associated with the first frame. This data may include the pixel data 136 and any extra data 138 that was generated, whether the extra data 138 was generated by the application 130, by the render component 132, and/or any other component of the host computer 106. The compression at block 314 may be optimized for a pre-distorted image(s), as opposed to a post-distorted image(s). For example, in systems where the entirety of the rendering workload is performed on a host computer, any compression of the pixel data that is sent to a headset may utilize a compression algorithm that mitigates stereo compression artifacts. In the process 300, because the pixel data 136 generated by the application 130 is "pre-distorted," meaning that adjustments—such as re-projection adjustments, geometric distortion adjustments, chromatic aberration adjustments, etc.— are to be applied after compression, the compression algorithm utilized at block 314 may not need to account for stereo compression artifact. In some embodiments, the pixel data 136 output by the application 130 may be classified into foreground pixels and background pixels (and potentially intermediate layers of pixels), and different compression algorithms or schemes can be used for the different pixel layers. That is, foreground pixels can be compressed differently (e.g., using a different compression algorithm) than the background pixels are compressed.

At 316, the host computer 106 may send, to the HMD 102, data that includes the pixel data 136 and extra data 138. The extra data 138 sent at block 316 can include, without limitation, the pose data 138(1) generated based on the first head tracking data 122 and used by the application 130 to generate the pixel data 136 for the first frame, depth data 138(2) generated by the application 130, extra pixel data 138(3) generated by the application 130, motion vector data 138(4) generated by the render component 132 based on head tracking data 122 and/or based on movements of virtual objects within the scene being rendered, parallax occlusion data 138(5), and/or cube map data (e.g., for rapid, large-scale head movements so that the HMD 102 has other options besides presenting dark pixels where it does not have any data). Again, the pixel data 136 and the extra data 138 may be sent to the HMD 102 in various ways, depending on the implementation, such as wirelessly, over a wired connection, via a wide-area network, etc.

At 318, the HMD 102 may receive, from the host computer 106, the pixel data 136 associated with the first frame and the extra data 138 in addition to the pixel data 136. Again, the pixel data 136 and the extra data 138 may be received from the host computer 106 in various ways, depending on the implementation, such as wirelessly, over a wired connection, via a wide-area network, etc. Furthermore, when compressed, serialized data is received by from the host computer 106 at block 318, the data may be deserialized and decompressed at block 318.

At 320, logic of the HMD 102 (e.g., the compositor 116) may determine, based at least in part on second head tracking data 122 generated by the head tracking system 118 of the HMD 102, an updated pose that the HMD 102 will be in at the illumination time for the first frame, which represents a time at which the light emitting elements of the display panel(s) 108 of the HMD 102 will illuminate for the first frame. Because the determination at block 320 is closer in time to the illumination time for the first frame, the pose prediction at block 320 is more accurate (e.g., has less error) than the pose prediction that was determined at block 308, which was further ahead the illumination time. In some embodiments, the determination of the updated pose of the HMD 102 at block 320 may be based at least in part on motion vector data 138(4) received from the host computer 106, or generated locally on the HMD 102. For example, the motion vector data 138(4) generated from head tracking data 122 may be indicative of predicted head movement of the user 104, and the compositor 116 of the HMD 102 may use the motion vector data 138(4) to, among other things, make the updated pose prediction of the HMD 102 with improved accuracy.

At 322, the logic of the HMD 102 (e.g., the compositor 116) may modify the pixel data 136 received from the host computer 106 to obtain modified pixel data. As shown by the sub-blocks of block 322, this modification of the pixel data 136 may include various sub-operations.

At sub-block 324, the logic of the HMD 102 (e.g., the compositor 116) may apply re-projection adjustments to the pixel data 136 to obtain modified pixel data associated with the first frame. The re-projection adjustments applied at sub-block 324 may be based at least in part on the extra data 138 received from the host computer 106. For example, a comparison between the original predicted pose determined at block 308 (and exhibited in the pose data 138(1)) and the updated pose determined at block 320 may reveal a delta (or difference) between the compared poses, and the re-projection adjustments may include rotational calculations to compensate for this delta (e.g., by shifting and/or rotating the pixel data 136 one way or another, depending on the delta between the two pose determinations).

In some embodiments, the extra data 138 received from the host computer 106 includes depth data 138(2) associated with the first frame, and the re-projection adjustments applied at sub-block 324 may be based at least in part on the depth data 138(2). For example, the depth data 138(2), such as from a depth buffer (or Z-buffer), may be indicative of occluded objects in the scene. Accordingly, the depth data 138(2) can be used to, among other things, adjust for the parallax of objects in the scene (e.g., a ship that is far away in world space may not move as much with head movement as a close-up object will move with the same head movement). Knowing the depth of pixels that correspond to virtual objects in the scene is helpful to know how to adjust for such parallax during re-projection on the HMD 102 at sub-block 324. Other ways of using depth data 138(2) on the HMD-side are described in more detail below. In some embodiments, the extra data 138 received from the host computer 106 includes extra pixel data 138(3) associated with the first frame, and the re-projection adjustments applied at sub-block 324 may be based at least in part on the extra pixel data 138(3). For example, in cases where rapid/large-scale head movement is occurring, at least some of the pixel values of the pixel data 136 may be replaced with the extra pixel values of the extra pixel data 138(3) to render a portion of the scene that corresponds to the user's 104 current head movement, as determined by the HMD 102. In some embodiments, the extra data 138 received from the host computer 106 includes motion vector data 138(4) associated with the first frame, and the re-projection adjustments applied at sub-block 324 may be based at least in part on the motion vector data 138(4).

At sub-block 326, the logic of the HMD 102 (e.g., the compositor 116) may apply geometric distortion adjustments to the pixel data 136 to obtain the modified pixel data associated with the first frame at block 322. Geometric distortion adjustments may compensate for the distortion of the near-to-eye optical subsystem (e.g., lenses and other optics) of the HMD 102. For similar reasons, at sub-block 328, the logic of the HMD 102 (e.g., the compositor 116) may apply chromatic aberration adjustments to the pixel data 136 to obtain the modified pixel data associated with the first frame at block 322.

At sub-block 330, the pixel data 136 may be modified by overlaying one or more virtual hands on the scene represented by the pixel data 136 to obtain the modified pixel data associated with the first frame at block 322. For example, the HMD 102 may be communicatively coupled to one or more handheld controllers whose movement and position in 3D space is tracked, much like the HMD 102, and the HMD 102 may receive hand tracking data from the handheld controller(s) (e.g., over a direct wireless data transmission from the handheld controller(s) to the HMD 102). The hand tracking data can be processed by the logic of the HMD 102 (e.g., the compositor 116) to render a virtual hand(s) on the scene, which are overlaid on the content of the scene.

At 332, the logic of the HMD 102 (e.g., the compositor 116) may output the modified pixel data to a frame buffer(s). Again, for a HMD 102 with a pair of display panels 108, this modified pixel data may correspond to a frame that represents a pair of images to be displayed on the pair of display panels 108, and may be output to a stereo frame buffer accordingly.

At 334, logic of the HMD 102 may cause a first image(s) to be presented on the display panel(s) 108 of the HMD 102 based on the modified pixel data output to the frame buffer at block 332. This may involve scanning out the modified pixel data to the display panel(s) 108 of the HMD 102 and illuminating the light emitting elements of the display panel(s) 108 to illuminate the pixels on the display panel(s) 108.

Figure 4:
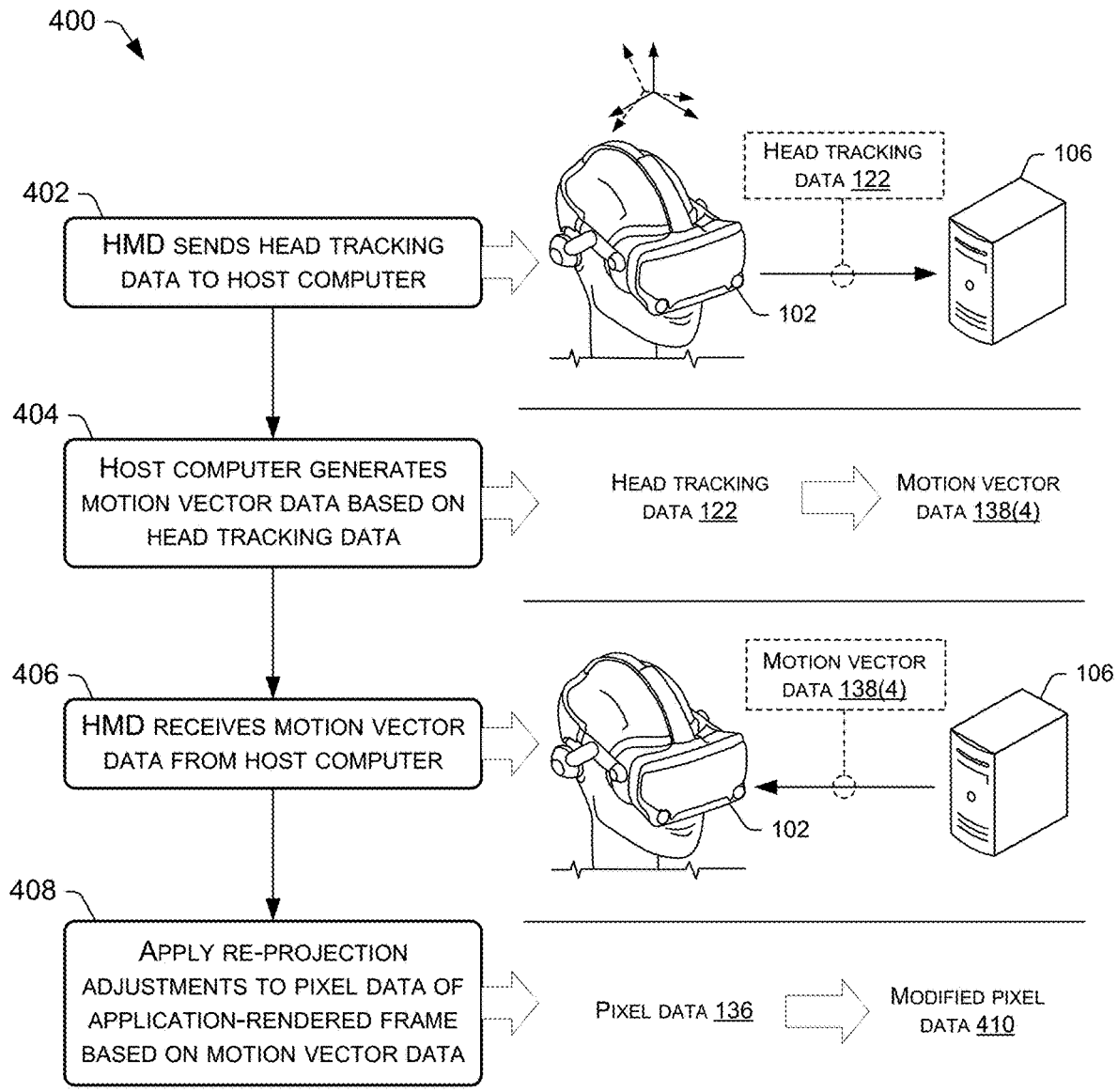
FIG. 4 illustrates a flow diagram of an example process for applying re-projection adjustments on a HMD based on motion vector data generated by a host computer, in accordance with embodiments disclosed herein.

FIG. 4 illustrates a flow diagram of an example process 400 for applying re-projection adjustments on a HMD 102 based on motion vector data 138(4) generated by a host computer 106, in accordance with embodiments disclosed herein. For discussion purposes, the process 400 is described with reference to the previous figures.

At 402, the HMD 102 may send head tracking data 122 to the host computer 106. This head tracking data 122 may be generated and/or sent at any suitable frequency, such as a frequency corresponding to the target frame rate of the application 130 and/or the refresh rate of the HMD 102, or a different (e.g., faster) frequency, and the head tracking data 122 may indicate head movement of the user 104 who is wearing the HMD 102. As such, the host computer 106, at block 402, may receive multiple instances of head tracking data 122 over time, such as first head tracking data 122 generated at time, $t_1$, second head tracking data 122 generated at time, $t_2$, and so on. Furthermore, the host computer 106 may maintain a history of head tracking data 122 that it received over time so that it has multiple instances of head tracking data 122 available at any given time. The host computer 106 can discard head tracking data 122 that is older than a predefined age to conserve memory resources, while retaining at least some past head tracking data 122.

At 404, logic of the host computer 106 (e.g., the render component 132) may generate motion vector data 138(4) based at least in part on head tracking data 122 received from the HMD 102. For example, the host computer 106 may receive first head tracking data 122, and may have received second head tracking data 122 prior to receiving the first head tracking data 122, and a comparison can be made between these sets of head tracking data 122 to generate motion vector data 138(4). In some embodiments, motion vector data 138(4) can additionally, or alternatively, be generated from pixel data associated with multiple frames rendered by the application. For example, a pair of frames previously rendered by the application 130 may be provided as input to the GPU(s) 128 of the host computer 106, and a decoder of the GPU(s) 128 may generate motion vector data 138(4) based at least in part on the input frames, such as by looking for similarities (e.g., similar color values, similar luminance values, etc.) in the pair of frames and mapping motion vectors to the corresponding positions of similarities in the pair of frames. In some embodiments, the logic of the host computer 106 may be configured to filter out motion relating to moving virtual objects in the scene so that it is left with motion due to head movement and not motion of virtual objects in the scene.

At 406, the HMD 102 may receive the motion vector data 138(4) from the host computer 106. For example, this motion vector data 138(4) may be sent as extra data 138 along with (e.g., packaged with) the pixel data 136 for a given frame whose imagery is to be presented on the HMD 102. Thus, at block 406, or at a slightly different (e.g., earlier or later) time, the HMD 102 may receive pixel data 136 for a given frame.

At 408, the logic of the HMD 102 (e.g., the compositor 116) may apply re-projection adjustments to the pixel data 136 based at least in part on the motion vector data 138(4) received at block 406 to obtain modified pixel data 410 associated with a given frame. The motion vector data 138(4) may be considered in addition to pose data indicative of an original predicted pose and an updated pose determination of the HMD 102, as described herein. As such, the motion vector data 138(4) may be augmentative to the pose data 138(1) for purposes of predicting a pose of the HMD 102 and thereby applying re-projection adjustments (e.g., rotational calculations to shift and/or rotate the pixel data 136 one way or another). Alternatively, the motion vector data 138(4) may be applied directly to the pixel data 136, such as by converting the motion vector data 138(4) into a motion vector field that corresponds to the screen space of the scene that is to be rendered, and shifting the pixel values based on the magnitude and direction of the motion vectors that correspond to those pixel values.

Figure 5:
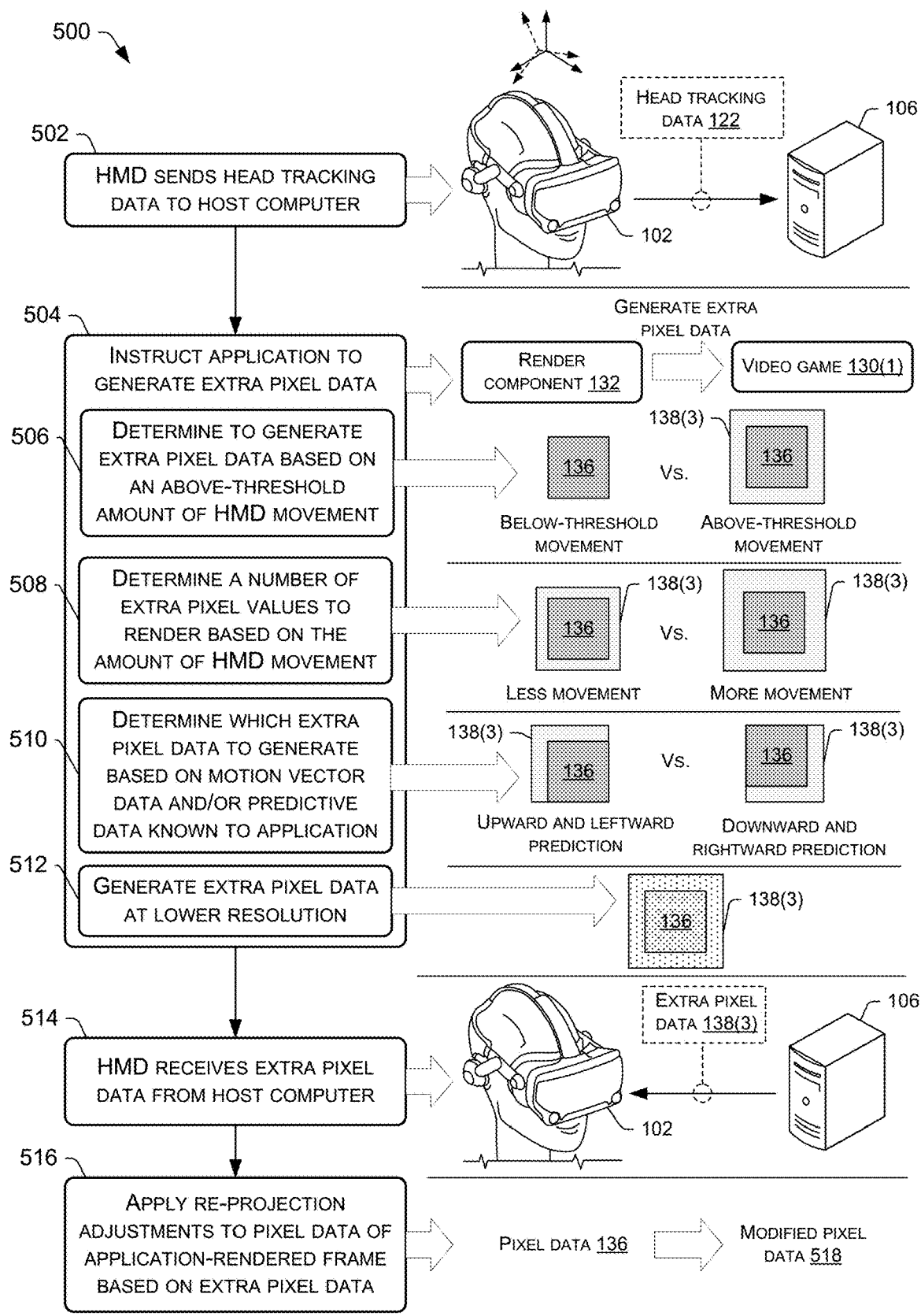
FIG. 5 illustrates a flow diagram of an example process for applying re-projection adjustments based on extra pixel data generated by an application executing on a host computer, in accordance with embodiments disclosed herein.

FIG. 5 illustrates a flow diagram of an example process 500 for applying re-projection adjustments based on extra pixel data 138(3) generated by an application 130 executing on a host computer 106, in accordance with embodiments disclosed herein. For discussion purposes, the process 500 is described with reference to the previous figures.

At 502, the HMD 102 may send head tracking data 122 to the host computer 106. This head tracking data 122 may be generated and/or sent at any suitable frequency, such as a frequency corresponding to the target frame rate of the application 130 and/or the refresh rate of the HMD 102, or a different (e.g., faster) frequency, and the head tracking data 122 may indicate head movement of the user 104 who is wearing the HMD 102.

At 504, logic of the host computer 106 (e.g., the render component 132) may instruct an application 130 executing on the host computer 106, such as a video game 130(1), to generate extra pixel data 138(3) in addition to the pixel data 136 that corresponds to the array of pixels on the display panel(s) 108 of the HMD 102. For example, if the display panel(s) 108 have an array of 2160×1200 pixels, the pixel data 136 may correspond to the pixel values in the 2160×1200 array of pixels, while extra pixel data 138(3) may correspond to pixels that are outside of the boundary of the 2160×1200 array. Accordingly, the pixel data 136 and the extra pixel data 138(3) being requested at block 504 may constitute a larger number of pixel values, such as a larger array of, say, 2400×1400 pixels, as an example. The determination to instruct the application 130 to generate extra pixel data 138(3) at block 504 may be a dynamic determination for the given frame, as illustrated by the sub-blocks of block 504.

At sub-block 506, logic of the host computer 106 (e.g., the render component 132) may determine to generate (e.g., by instructing the application 130 to generate) extra pixel data 138(3) based at least in part on the head tracking data 122 received at block 502 indicating an amount of movement of the HMD 102 that is greater than a threshold amount of movement. For example, two instances of head tracking data 122 may be compared to determine an amount of movement of the HMD 102 over a period of time (e.g., a period of a few milliseconds), and if that amount of movement is greater than a threshold amount of movement, the render component 132 may determine to generate extra pixel data 138(3) for the given frame. If, on the other hand, the amount of movement of the HMD 102 is less than or equal to the threshold amount of movement, the render component 132 may determine to refrain from generating extra pixel data 138(3) for the given frame. This is shown pictorially to the right of sub-block 506 in FIG. 5, where the render component 132 is configured to instruct the application 130 to render only the pixel data 136 (and to not render any extra pixel data 138(3) if the amount of HMD movement is at or below a threshold amount of movement, and to instruct the application 130 to render the pixel data 136 and extra pixel data 138(3) if the amount of HMD movement is above the threshold amount of movement. This allows for conserving resources by determining that extra pixel data 138(3) is unlikely to be used if there is currently little-to-no head movement, and to reserve the generation of extra pixel data 138(3) for instances where there is currently a large amount and/or rapid head movement.

At sub-block 508, logic of the host computer 106 (e.g., the render component 132) may determine to render (e.g., by instructing the application 130 to render) a number of the extra pixel values in the extra pixel data 138(3) based at least in part on an amount of movement of the HMD 102 indicated by the head tracking data 122 received at block 502. This is shown pictorially to the right of sub-block 508 in FIG. 5, where the render component 132 is configured to instruct the application 130 to render a first number of extra pixel values in the extra pixel data 138(3) if the amount of HMD movement is a first, lesser amount of movement, and to instruct the application 130 to render a second, greater number of extra pixel values in the extra pixel data 138(3) if the amount of HMD movement is a second, greater amount of movement. For example, for less head movement, the render component 132 may instruct the application 130 to render a total of 2300×1300 pixels, and for more head movement, the render component 132 may instruct the application 130 to render a total of 2500×1500 pixels (i.e., a greater amount of extra pixel values for a fixed number of "on-screen" pixel values of the pixel data 136). In other words, the buffer of extra pixels may expand or shrink based on the degree of head movement. This, again, is a technique to conserve resources on the host computer 106 by generating a sufficient amount of extra pixel data 138(3), but not a superfluous amount of extra pixel data 138(3).

At sub-block 510, logic of the host computer 106 (e.g., the render component 132) may determine to generate (e.g., by instructing the application 130 to generate) particular extra pixel data 138(3) based at least in part on at least one of the motion vector data 138(4) or predictive data known to and/or generated by the application 130. For example, if the motion vector data 138(4) is indicative of head movement in an upward and leftward direction with reference to a view looking at a front side of the display panel(s) 108 of the HMD 102, the render component 132 may determine to instruct the application 130 to generate extra pixel data 138(3) above the topmost pixels in the pixel data 136 and to the left of the leftmost pixels of the pixel data 136, and to refrain from generating extra pixel data 138(3) to the right or below the rightmost and bottommost pixels, respectively, of the pixel data 136, which conserves resources of the host computer 106. In other words, if it is unlikely that the user 104 will move his/her head to the right and/or down, then extra pixels to the right of the rightmost pixels in the scene and below the bottommost pixels in the scene do not have to be rendered due to the low likelihood of the user 104 needing to see those pixels. Similarly, if the motion vector data 138(4) is indicative of head movement in a downward and rightward direction with reference to a view looking at a front side of the display panel(s) 108 of the HMD 102, the render component 132 may determine to instruct the application 130 to generate extra pixel data 138(3) below the bottommost pixels in the pixel data 136 and to the right of the rightmost pixels of the pixel data 136, and to refrain from generating extra pixel data 138(3) to the left or above the leftmost and topmost pixels, respectively, of the pixel data 136, which conserves resources of the host computer 106. This is shown pictorially to the right of sub-block 510 in FIG. 5.

In some embodiments, at block 510, the determination of which "out-of-bounds" pixels to render may be determined from predictive data obtained from the application 130. For example, if, based on information obtained from the execution application 130, the render component 132 knows (or predicts with high likelihood) that an explosion is about to occur very soon on the left side of the screen, the render component 132 can predict, with high likelihood, future head movement in the leftward direction (i.e., towards the explosion). Accordingly, for the given frame, the render component 132 may instruct the application 130, at sub-block 510, to render "out-of-bounds" pixels beyond the leftmost pixels in the scene in anticipation of the leftward head movement so that, if the user 104 moves his/her head, as predicted, to the left in reaction to seeing the explosion, the out-of-bounds pixels may utilized for presenting the image for that frame.

At sub-block 512, logic of the host computer 106 (e.g., the render component 132) may determine to generate (e.g., by instructing the application 130 to generate) the pixel data 136 at a first resolution and to generate the extra pixel data 138(3) at a second resolution lower than the first resolution. This is yet another technique to conserve resources where it is anticipated that the extra pixel data 138(3) will be used to create a re-projected frame if there is large-scale or rapid head movement, but otherwise may not be used, and because the extra pixel data 138(3) is used during large-scale or rapid head movement, the lower resolution is unlikely to be noticed by the user 104 when the scene in front of the user's 104 eyes is moving. In other words, the "out-of-bounds" pixels in the extra pixel data 138(3) are expected to be used if there is unexpected head movement, but otherwise discarded, which means that head movement is likely to occur during presentation of the image based on extra pixel data 138(3), and the user can often tolerate lower-resolution images during head movement because their eyes are busy tracking the scene, and the fine details in a scene often go unnoticed during head movement.

At 514, after the render component 132 obtains the extra pixel data 138(3) from the application 130, the HMD 102 may receive the extra pixel data 138(3) from the host computer 106. For example, this extra pixel data 138(3) may be sent as extra data 138 along with (e.g., packaged with) the pixel data 136 for a given frame whose imagery is to be presented on the HMD 102. Thus, at block 514, or at a slightly different (e.g., earlier or later) time, the HMD 102 may receive pixel data 136 for a given frame.

At 516, the logic of the HMD 102 (e.g., the compositor 116) may apply re-projection adjustments to the pixel data 136 based at least in part on the extra pixel data 138(3) received at block 514 to obtain modified pixel data 518 associated with a given frame. The extra pixel data 138(3) may include extra pixel values outside of a boundary of the array of pixels of the display panel(s) 108 of the HMD 102, and may be used in re-projection by replacing at least some of the pixel values included in the pixel data 136 with at least some of the extra pixel values included in the extra pixel data 138(3). For example, if re-projection adjustments shift the pixel data 136 leftward, the extra pixel data 138(3) to the right of the rightmost pixels of the pixel data 136 may be output in the modified pixel data 518. These "out-of-bounds" pixel values (e.g., pixel values that are beyond the left, right, top, and/or bottom edge of the pixels corresponding to the display panel(s) 108), allow for content to be displayed in a final image instead of displaying dark pixels. Although this means that more pixels are rendered than the number of pixels that will actually be displayed in a final image, this redundancy measure compensates for latency in a wireless communication link between the HMD 102 and the host computer 106, for example. That said, the resource conserving techniques described with reference to the process 500 may improve the performance of the computing device regardless of the redundant measures that are taken in account of the latency in data transfer.

Figure 6:
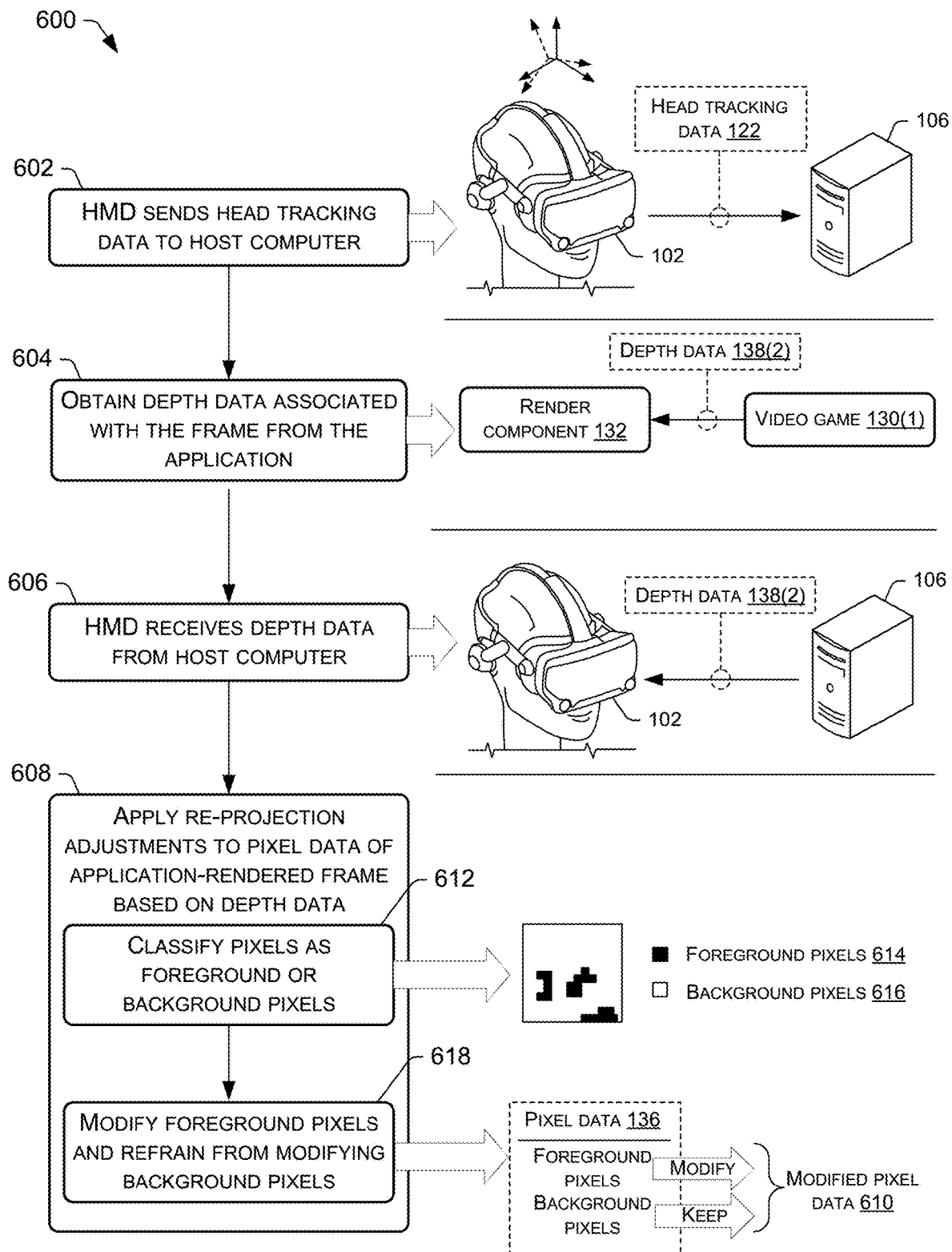
FIG. 6 illustrates a flow diagram of an example process for applying re-projection adjustments based on depth data generated by an application executing on a host computer, in accordance with embodiments disclosed herein.

FIG. 6 illustrates a flow diagram of an example process 600 for applying re-projection adjustments based on depth data 138(2) generated by an application 130 executing on a host computer 106, in accordance with embodiments disclosed herein. For discussion purposes, the process 600 is described with reference to the previous figures.

At 602, the HMD 102 may send head tracking data 122 to the host computer 106. This head tracking data 122 may be generated and/or sent at any suitable frequency, such as a frequency corresponding to the target frame rate of the application 130 and/or the refresh rate of the HMD 102, or a different (e.g., faster) frequency, and the head tracking data 122 may indicate head movement of the user 104 who is wearing the HMD 102.

At 604, the render component 132 may instruct the application 130 to generate, and the render component 132 may obtain from the application 130, depth data 138(2) associated with a given frame. The depth data 138(2) (or, Z-buffer data), may be indicative of occluded objects in a scene, indicating their depth relative to a location of the user in world space.

At 606, the HMD 102 may receive the depth data 138(2) from the host computer 106. For example, this depth data 138(2) may be sent as extra data 138 along with (e.g., packaged with) the pixel data 136 for a given frame whose imagery is to be presented on the HMD 102. Thus, at block 606, or at a slightly different (e.g., earlier or later) time, the HMD 102 may receive pixel data 136 for a given frame.

At 608, the logic of the HMD 102 (e.g., the compositor 116) may apply re-projection adjustments to the pixel data 136 based at least in part on the depth data 138(2) received at block 606 to obtain modified pixel data 610 associated with a given frame. As shown by the sub-blocks of block 608, the modification of the pixel data 136 based on the depth data 138(2) may involve sub-operations.

At sub-block 612, the logic of the HMD 102 (e.g., the compositor 116) may classify, based at least in part on the depth data 138(2), a first subset of the pixel values included in the pixel data 136 as foreground pixels 614 and a second subset of the pixel values included in the pixel data 136 as background pixels 616. At block 612, one or more intermediate layers may be used to classify pixels, such as a mid-layer between the foreground and the background. Thus, the pixels included in the pixel data 136 can be classified into multiple layers at any suitable granularity.

At sub-block 618, the applying of the re-projection adjustments at block 608 may include modifying the first subset of the pixel values classified as the foreground pixels 614, and refraining from modifying the second subset of the pixel values classified as the background pixels 616. In other words, the compositor 116 of the HMD 102 may apply different adjustments, or no adjustments, for a given pixel depending on the layer in which that pixel is classified (e.g., foreground vs. background). This is yet another a resource conservation technique to avoid wasting computing resources on applying re-projection adjustments to background pixels 616, seeing as how slight inaccuracies in the background content will go unnoticed by the user 104. This technique described in the process 600 may be enabled by defining different update rates at which re-projection adjustments are applied for different layers of classified pixels, as determined from the depth data 138(2). For example, background pixels corresponding to object in the background of a scene may be updated (for re-projection) less frequently than foreground pixels corresponding to objects in the foreground of the scene. For example, logic of the HMD 102 (e.g., the compositor 116) may perform re-projection adjustments on background pixels 616 at 30 Hz, while performing re-projection adjustments on foreground pixels 614 at a higher frequency, such as 90 Hz. For a frame rate of 90 Hz, this would mean that foreground pixels 614 are modified for re-projection adjustments at every frame, while background pixels 616 are modified for re-projection adjustments every third frame in a series of frames, which means that two sequential frames would include no re-projection adjustments for background pixels to conserve resources. This is at least partly based on the notion of the re-projection adjustments for background pixels 616 are expected to be smaller-scale adjustments than the re-projection adjustments for foreground pixels 614 given the same error in the original pose prediction of the HMD 102.

Figure 7:
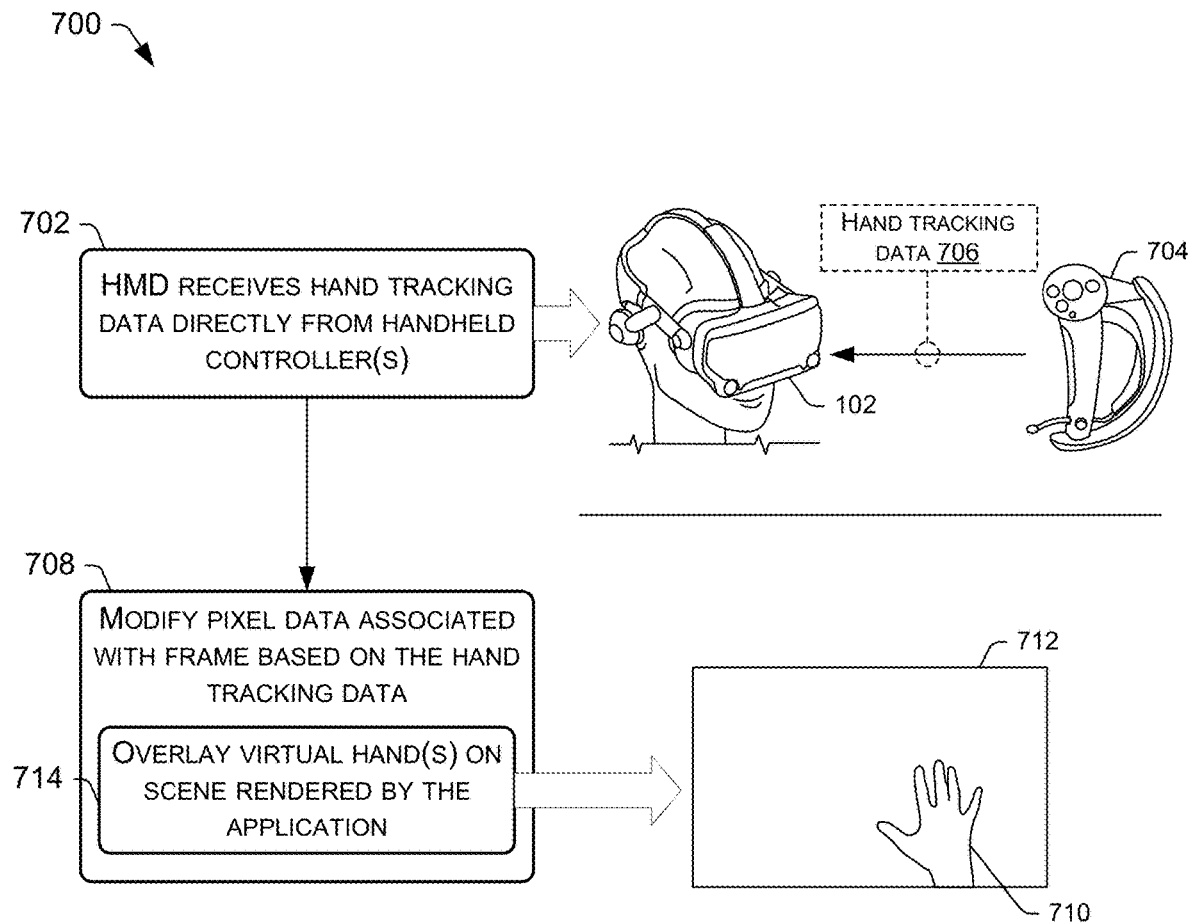
FIG. 7 illustrates a flow diagram of an example process for an HMD to receive hand tracking data directly from a handheld controller, and overlaying a virtual hand(s) on an application-rendered scene using the hand tracking data, in accordance with embodiments disclosed herein.

FIG. 7 illustrates a flow diagram of an example process 700 for an HMD 102 to receive hand tracking data directly from a handheld controller, and overlaying a virtual hand(s) on an application-rendered scene using the hand tracking data, in accordance with embodiments disclosed herein. For discussion purposes, the process 700 is described with reference to the previous figures.

At 702, the HMD 102 may receive, from at least one handheld controller 704 that is communicatively coupled to the HMD 102, hand tracking data 706. The handheld controller(s) 704 may represent video game controllers, such as a handheld VR controller whose movement and/or position in 3D space is tracked much like the movement and/or position of the HMD 102 can be tracked. Instead of the handheld controller(s) 704 sending hand tracking data 706 to the host computer 106 for overlaying virtual hands on the scene at the host computer 106, a latency reducing measure can be taken by having the handheld controller(s) 704 send hand tracking data 706 indicative of movement and/or position of the handheld controller(s) 704 directly to the HMD 102, without sending the hand tracking data 706 to the host computer 106 before the hand tracking data 706 is received by the HMD 102. The hand tracking data 706 may include data generated by tracking sensors mounted on the handheld controller(s) 704 and possibly proximity sensor data generated by proximity sensors of the handheld controller 704 (e.g., capacitive sensors) to indicate finger positioning/distance relative to the handheld controller 704.

At 708, logic of the HMD 102 (e.g., the compositor 116) may modify, based at least in part on the hand tracking data 706, the pixel data 136 for a given frame to include one or more virtual hands 710 overlaid on a scene 712 represented by the pixel data 136 to obtain the modified pixel data associated with the given frame. For example, at sub-block 714, the compositor 116 of the HMD 102 may overlay one or more virtual hands on 710 on the scene rendered by the application 130 by replacing pixel values generated by the application 130 with pixel values generated by the compositor 116 to present the virtual hand(s) 710. The HMD 102 can therefore render the virtual hand(s) 710 on the scene 712 based on the hand tracking data 706 the HMD 102 receives directly from the handheld controller(s) 704. This may allow for minimizing re-projection adjustments for the rendering of the virtual hand(s) 710 because the pose prediction for the handheld controller(s) 704 does not have to be made as far in advance if data does not have to transmitted to the host computer 106 and then from the host computer 106 to the HMD 102.

Figure 8B:
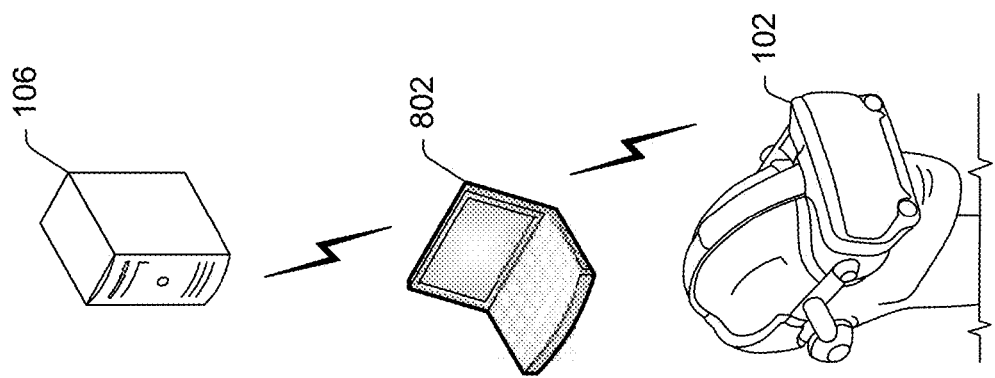
FIGS. 8A and 8B illustrate two alternative setups of a system that splits a rendering workload for a frame between a HMD and a host computer, in accordance with embodiments disclosed herein.
Figure 8A:
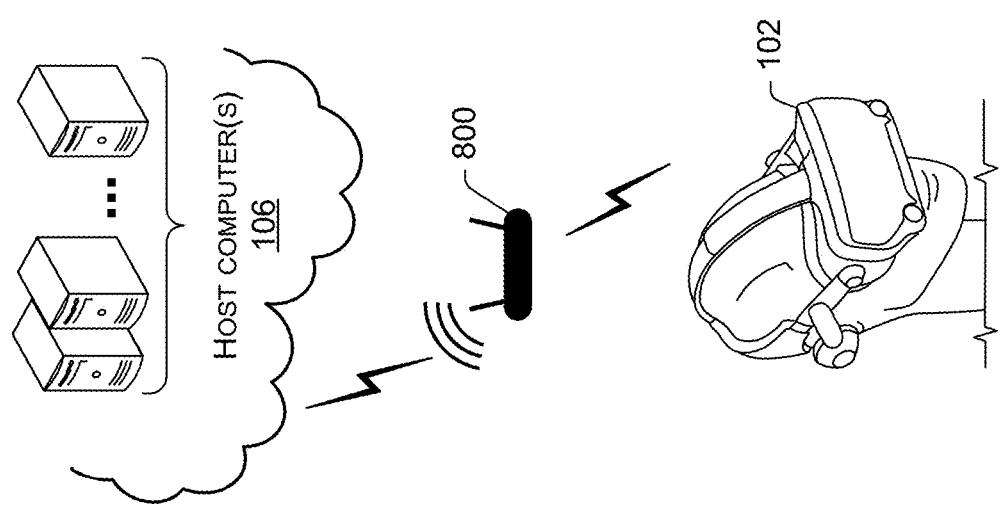

FIGS. 8A and 8B illustrate two alternative setups of a system that splits a rendering workload 100 for a frame between a HMD 102 and a host computer 106, in accordance with embodiments disclosed herein. Briefly referring to FIG. 1, an example implementation is where the host computer 106 is collocated in an environment with the HMD 102 worn by the user 104. For example, the host computer 106 may be located in the user's 104 house while the user 104 is using the HMD 102 in the house, regardless of whether the host computer 106 is located in the same room or a different room as the HMD 102. Alternatively, the host computer 106 in the form of a mobile computing device (e.g., a tablet or laptop) may be carried in a backpack on the back of the user 104, thereby allowing for greater mobility. For example, the user 104 could be located in a public park while using such a system.

FIG. 8A shows an alternative implementation where the host computer 106 represents one or more server computers located at a geographically remote location with respect to the HMD 102. In this case, the HMD 102 may be communicatively coupled to the host computer(s) 106 via an access point (AP) 800, such as a wireless AP (WAP), a base station, etc. In an illustrative example, data is exchanged (e.g., streamed) between the host computer 106 and the HMD 102 via the AP 800, such as by streaming data over the Internet.

FIG. 8B shows yet another alternative implementation where the host computer 106 is communicatively coupled to the HMD 102 via an intermediate computing device 802, such as a laptop or a tablet computer. A difference between FIGS. 8A and 8B is that the AP 800 in FIG. 8A may simply act as a data routing device that does not perform rendering, while the intermediate computing device 802 of FIG. 8B may perform a portion of the rendering workload 100. That is, instead of bifurcating the rendering workload 100 between the host computer 106 and the HMD 102, the rendering workload 100 can be partitioned between more than two devices, such as three device: the host computer 106, the intermediate computing device 802, and the HMD 102. In the scenario of FIG. 8B, the host computer 106 may generate pixel data 136, as described herein, the intermediate computing device 802 may perform a first set of rendering operations to modify the pixel data 136, and the HMD 102 may perform a final set of rendering operations to modify the modified pixel data.

Figure 9:
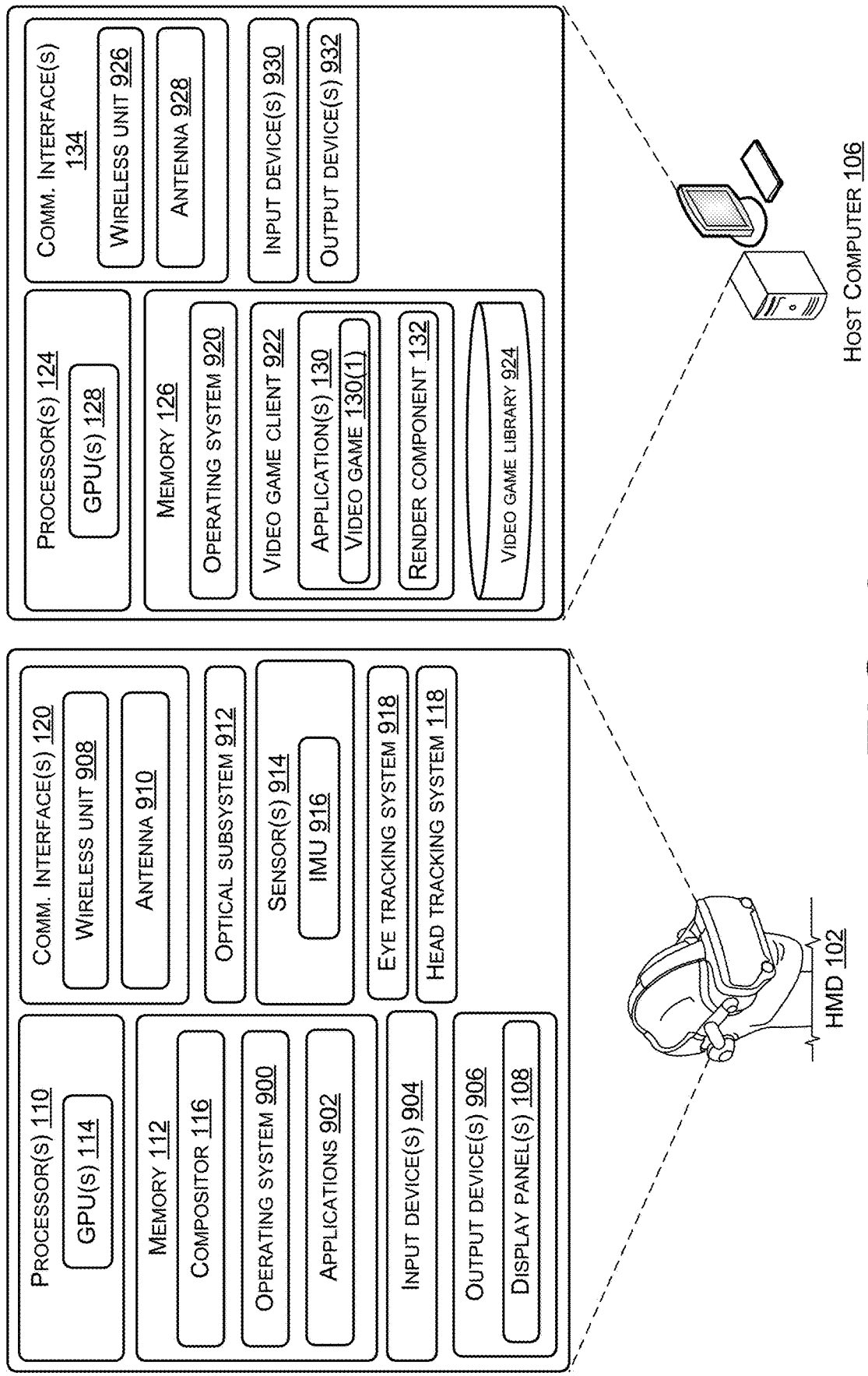
FIG. 9 illustrates example components of a wearable device, such as a HMD (e.g., a VR headset), and a host computer, in which the techniques disclosed herein can be implemented.

FIG. 9 illustrates example components of a wearable device, such as a HMD 102 (e.g., a VR headset), and a host computer 106, in which the techniques disclosed herein can be implemented, according to the embodiments disclosed herein. The HMD 102 may be implemented as a connected device that is communicatively coupled to the host computer 106 during operation, and/or as a standalone device. In either mode of operations, the HMD 102 is to be worn by a user 104 (e.g., on a head of the user 104). In some embodiments, the HMD 102 may be head-mountable, such as by allowing a user 104 to secure the HMD 102 on his/her head using a securing mechanism (e.g., an adjustable band) that is sized to fit around a head of a user 104. In some embodiments, the HMD 102 comprises a virtual reality (VR) or augmented reality (AR) headset that includes a near-eye or near-to-eye display(s). As such, the terms "wearable device", "wearable electronic device", "VR headset", "AR headset", and "head-mounted display (HMD)" may be used interchangeably herein to refer to the device 102 of FIG. 9. However, it is to be appreciated that these types of devices are merely example of a HMD 102, and it is to be appreciated that the HMD 102 may be implemented in a variety of other form factors. It is also to be appreciated that some or all of the components shown in FIG. 9 may be implemented on the HMD 102. Accordingly, in some embodiments, a subset of the components shown as being implemented in the HMD 102 may be implemented on the host computer 106 or another computing device that is separate from the HMD 102.

In the illustrated implementation, the HMD 102 includes the aforementioned processor(s) 110, which may include one or more GPUs 114, as well as the memory 112 storing the compositor 116 that is executable by the processor(s) 110, the display panel(s) 108, the head tracking system 118, and the communications interface(s) 120.

Additional functional modules are shown as being stored in the computer-readable media 112 and executable on the processor(s) 110, although the same functionality may alternatively be implemented in hardware, firmware, or as a SOC, and/or other logic. For example, an operating system module 900 may be configured to manage hardware within and coupled to the HMD 102 for the benefit of other modules. In addition, in some instances the HMD 102 may include one or more applications 902 stored in the memory 112 or otherwise accessible to the HMD 102. For example, the application(s) 902 may include, without limitation, a video game application (e.g., a basic video game with graphics that are less-computationally-intensive to process), a video playback application (e.g., an application that accesses a video content library stored on the HMD 102 and/or in the cloud), etc. The HMD 102 may include any number or type of applications 902 and is not limited to the specific examples described herein.

Generally, the HMD 102 has input devices 904 and output devices 906. The input devices 904 may include control buttons. In some implementations, one or more microphones may function as input devices 904 to receive audio input, such as user voice input. In some implementations, one or more cameras or other types of sensors (e.g., inertial measurement unit (IMU)) may function as input devices 904 to receive gestural input, such as a hand and/or head motion of the user 104. In some embodiments, additional input devices 904 may be provided in the form of a keyboard, keypad, mouse, touch screen, joystick, and the like. In other embodiments, the HMD 102 may omit a keyboard, keypad, or other similar forms of mechanical input. Instead, the HMD 102 may be implemented relatively simplistic forms of input device 904, a network interface (wireless or wire-based), power, and processing/memory capabilities. For example, a limited set of one or more input components may be employed (e.g., a dedicated button to initiate a configuration, power on/off, etc.) so that the HMD 102 can thereafter be used. In one implementation, the input device(s) 904 may include control mechanisms, such as basic volume control button(s) for increasing/decreasing volume, as well as power and reset buttons.

The output devices 906 may include a display panel(s) 108, which may include one or multiple display panels 108

(e.g., a stereo pair of display panels 108), as described herein. The output devices 906 may further include, without limitation, a light element (e.g., LED), a vibrator to create haptic sensations, a speaker(s) (e.g., headphones), and/or the like. There may also be a simple light element (e.g., LED) to indicate a state such as, for example, when power is on.

The HMD 102 may further include a communications interface(s) 120 including, without limitation, a wireless unit 908 coupled to an antenna 910 to facilitate a wireless connection to a network and/or to a second device, such as the host computer 106. The wireless unit 908 may implement one or more of various wireless technologies, such as Wi-Fi, Bluetooth, radio frequency (RF), and so on. It is to be appreciated that the HMD 102 may further include physical ports to facilitate a wired connection to a network and/or a second device, such as the host computer 106.

The HMD 102 may further include optical subsystem 912 that directs light from the display panel(s) 108 to a user's eye(s) using one or more optical elements. The optical subsystem 912 may include various types and combinations of different optical elements, including, without limitations, such as apertures, lenses Fresnel lenses, convex lenses, concave lenses, etc.), filters, and so forth. In some embodiments, one or more optical elements in optical subsystem 912 may have one or more coatings, such as anti-reflective coatings. Magnification of the image light by optical subsystem 912 allows display panel(s) 108 to be physically smaller, weigh less, and consume less power than larger displays. Additionally, magnification of the image light may increase a field of view (FOV) of the displayed content (e.g., images). For example, the FOV of the displayed content is such that the displayed content is presented using almost all (e.g., 120-150 degrees diagonal), and in some cases all, of the user's FOV. AR applications may have a narrower FOV (e.g., about 40 degrees FOV). Optical subsystem 912 may be designed to correct one or more optical errors, such as, without limitation, barrel distortion, pincushion distortion, longitudinal chromatic aberration, transverse chromatic aberration, spherical aberration, comatic aberration, field curvature, astigmatism, and so forth. In some embodiments, content provided to display panel(s) 108 for display is pre-distorted (e.g., by the applied geometric distortion adjustments and/or chromatic aberration adjustments described herein), and optical subsystem 912 corrects the distortion when it receives image light from display panel(s) 108 generated based on the content.

The HMD 102 may further include one or more sensors 914, such as sensors used to generate motion, position, and orientation data. These sensors 914 may be or include gyroscopes, accelerometers, magnetometers, video cameras, color sensors, or other motion, position, and orientation sensors. The sensors 914 may also include sub-portions of sensors, such as a series of active or passive markers that may be viewed externally by a camera or color sensor in order to generate motion, position, and orientation data. For example, a VR headset may include, on its exterior, multiple markers, such as reflectors or lights (e.g., infrared or visible light) that, when viewed by an external camera or illuminated by a light (e.g., infrared or visible light), may provide one or more points of reference for interpretation by software in order to generate motion, position, and orientation data. The HMD 102 may include light sensors that are sensitive to light (e.g., infrared or visible light) that is projected or broadcast by base stations in the environment of the HMD 102.

In an example, the sensor(s) 914 may include an inertial measurement unit (IMU) 916. MU 916 may be an electronic device that generates calibration data based on measurement signals received from accelerometers, gyroscopes, magnetometers, and/or other sensors suitable for detecting motion, correcting error associated with IMU 916, or some combination thereof. Based on the measurement signals such motion-based sensors, such as the IMU 916, may generate calibration data indicating an estimated position of HMD 102 relative to an initial position of HMD 102. For example, multiple accelerometers may measure translational motion (forward/back, up/down, left/right) and multiple gyroscopes may measure rotational motion (e.g., pitch, yaw, and roll). IMU 916 can, for example, rapidly sample the measurement signals and calculate the estimated position of HMD 102 from the sampled data. For example, IMU 916 may integrate measurement signals received from the accelerometers over time to estimate a velocity vector and integrates the velocity vector over time to determine an estimated position of a reference point on HMD 102. The reference point is a point that may be used to describe the position of the HMI) 102. While the reference point may generally be defined as a point in space, in various embodiments, reference point is defined as a point within HMD 102 (e.g., a center of the IMU 916). Alternatively, IMU 916 provides the sampled measurement signals to an external console (or other computing device), which determines the calibration data.

The sensors 914 may operate at relatively high frequencies in order to provide sensor data at a high rate. For example, sensor data may be generated at a rate of 1000 Hz (or 1 sensor reading every 1 millisecond). In this way, one thousand readings are taken per second. When sensors generate this much data at this rate (or at a greater rate), the data set used for predicting motion is quite large, even over relatively short time periods on the order of the tens of milliseconds.

As mentioned, in some embodiments, the sensors 914 may include light sensors that are sensitive to light emitted by base stations in the environment of the HMD 102 for purposes of tracking position and/or orientation, pose, etc., of the HMD 102 in 3D space. The calculation of position and/or orientation may be based on timing characteristics of light pulses and the presence or absence of light detected by the sensors 914.

The HMD 102 may further include an eye tracking system 918 that generates eye tracking data. The eye tracking system 918 may include, without limitation, a camera or other optical sensor inside HMD 102 to capture image data (or information) of a user's eyes, and the eye tracking system 918 may use the captured data/information to determine motion vectors, interpupillary distance, interocular distance, a three-dimensional (3D) position of each eye relative to HMI) 102, including a magnitude of torsion and rotation (i.e., roll, pitch, and yaw) and gaze directions for each eye. In one example, infrared light is emitted within HMD 102 and reflected from each eye. The reflected light is received or detected by a camera of the eye tracking system 918 and analyzed to extract eye rotation from changes in the infrared light reflected by each eye. Many methods for tracking the eyes of a user 104 can be used by eye tracking system 918. Accordingly, eye tracking system 918 may track up to six degrees of freedom of each eye (i.e., 3D position, roll, pitch, and yaw) and at least a subset of the tracked quantities may be combined from two eyes of a user 104 to estimate a gaze point (i.e., a 3D location or position in the virtual scene where the user is looking), which may map to a location(s) on the display panel(s) 108 for predicting where the user 104 will be looking in terms of an individual subset (e.g., a row) or a group of contiguous subsets (e.g., a group of contiguous rows) of the pixels of the display panel(s) 108. For example, eye tracking system 918 may integrate information from past measurements, measurements identifying a position of a user's 104 head, and 3D information describing a scene presented by display panel(s) 108. Thus, information for the position and orientation of the user's 104 eyes is used to determine the gaze point in a virtual scene presented by HMD 102 where the user 104 is looking, and to map that gaze point to a location(s) on the display panel(s) 108 of the HMD 102.

The HMD 102 may further include the aforementioned head tracking system 118. The head tracking system 118 may leverage one or more of the sensor 914 to track head motion, including head rotation, of the user 104, as described above. For example, the head tracking system 118 can track up to six degrees of freedom of the HMD 102 (i.e., 3D position, roll, pitch, and yaw). These calculations can be made at every frame of a series of frames so that the application 130 can determine how to render a scene in the next frame in accordance with the head position and orientation. In some embodiments, the head tracking system 118 is configured to generate head tracking data 122 that is usable to predict a future pose (position and/or orientation) of the HMD 102 based on current and/or past data, and/or based on the known/implied scan out latency of the individual subsets of pixels in a display system. This is because the application 130 is asked to render a frame before the user 104 actually sees the light (and, hence, the image) on the display panel(s) 108. Accordingly, a next frame can be rendered based on this future prediction of head position and/or orientation that was made at an earlier point in time. Rotation data provided by the head tracking system 118 can be used to determine both direction of HMD 102 rotation, and amount of HMD 102 rotation in any suitable unit of measurement. For example, rotational direction may be simplified and output in terms of positive or negative horizontal and positive or negative vertical directions, which correspond to left, right, up, and down. Amount of rotation may be in terms of degrees, radians, etc. Angular velocity may be calculated to determine a rate of rotation of the HMD 102.

In the illustrated implementation, the host computer includes the aforementioned processor(s) 124, which may include one or more GPUs 128, as well as the memory 126 storing the application(s) 130 and render component 132 that are executable by the processor(s) 128, and the communications interface(s) 134.

The memory 126 may further include an operating system 920 configured to manage hardware within and coupled to the host computer 106 for the benefit of other modules. The host computer 106 may also have a video game client 922 installed in the memory 126. The video game client 922 may represent an executable client application that is configured to launch and execute programs, such as video games (or video game programs). In other words, the video game client 922 may include gaming software that is usable to play video games on the system that includes the HMD 102 and the host computer 106. With the video game client 922 installed, the host computer 106 may then have the ability to receive (e.g., download, stream, etc.) video games from a remote system over the computer network (e.g., the Internet), and to execute the video games via the video game client 922. Any type of content-distribution model can be utilized for this purpose, such as a direct purchase model where video games are individually purchasable for download and execution on a host computer 106, a subscription-based model, a content-distribution model where video games are rented or leased for a period of time, and so on. Accordingly, the host computer 106 may include one or more video games, such as the video game 130(1), within a video game library 924. These video games may be retrieved and executed by loading the video game client 922. In an example, a user 104 may choose to play one of multiple video games they have purchased and downloaded to the video game library 924 by loading the video game client 922 and selecting a video game 130(1) to start execution of the video game 130(1). The video game client 922 may allow users to login to a video game service using credentials (e.g., a user account, password, etc.).

The host computer 106 may further include a communications interface(s) 134 including, without limitation, a wireless unit 926 coupled to an antenna 928 to facilitate a wireless connection to a network and/or to a second device, such as the HMD 102. The wireless unit 926 may implement one or more of various wireless technologies, such as Wi-Fi, Bluetooth, radio frequency (RF), and so on. It is to be appreciated that the host computer 106 may further include physical ports to facilitate a wired connection to a network and/or a second device, such as the HMD 102.

Generally, the host computer 106 has input devices 930 and output devices 932. The input devices 930 may a keyboard, keypad, mouse, touch screen, joystick, control buttons, microphones, cameras, and the like. The output devices 932 may include, without limitation, a display(s), a light element (e.g., LED), a vibrator to create haptic sensations, a speaker(s) (e.g., headphones), and/or the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A head-mounted display (HMD) comprising:
   one or more display panels having an array of light emitting elements;
   a head tracking system;
   a processor; and
   memory storing computer-executable instructions that, when executed by the processor, cause the HMD to:
      send, to a host computer that is communicatively coupled to the HMD, first head tracking data generated by the head tracking system;
      receive, from the host computer, and based at least in part on the first head tracking data;
         pixel data associated with a first frame rendered at a frame rate by an application executing on the host computer; and
         extra data in addition to the pixel data, the extra data including:
            pose data indicative of a predicted pose of the HMD that was used by the application to generate the pixel data; and
            depth data associated with the first frame;
      determine, based at least in part on second head tracking data generated by the head tracking system, an updated pose that the HMD will be in at a time at which the light emitting elements will illuminate for the first frame;
      classify, based at least in part on the depth data, the pixel data as foreground pixels and background pixels;
      apply, based at least in part on the depth data and a comparison between the predicted pose and the updated pose, re-projection adjustments to the pixel data to obtain modified pixel data associated with the first frame, wherein applying the re-projection adjustments to the pixel data based at least in part on the depth data comprises:
  modifying the foreground pixels based at least in part on a first rate at which the re-projection adjustments are to be applied to the foreground pixels; and
  modifying the background pixels based at least in part on a second rate at which the re-projection adjustments are to be applied to the background pixels, the second rate being less than the first rate and less than the frame rate; and
present a first image on the one or more display panels based at least in part on the modified pixel data.

2. The HMD of claim 1, wherein:
the host computer is wirelessly coupled to the HMD;
the first head tracking data is sent wirelessly to the host computer; and
the pixel data and the extra data are received wirelessly from the host computer.

3. The HMD of claim 1, wherein the computer-executable instructions, when executed by the processor, further cause the HMD to:
receive, from the host computer, second pixel data and second depth data associated with a second frame;
classify, based at least in part on the second depth data, the second pixel data as second foreground pixels and second background pixels;
apply, based at least in part on the second depth data, second re-projection adjustments to the second pixel data to obtain second modified pixel data associated with the second frame, wherein applying the second re-projection adjustments to the second pixel data based at least in part on the second depth data comprises:
  modifying the second foreground pixels based at least in part on the first rate; and
  refraining from modifying the second background pixels based at least in part on the second rate; and
present a second image on the one or more display panels based at least in part on the second modified pixel data.

4. The HMD of claim 1, wherein the computer-executable instructions, when executed by the processor, further cause the HMD to:
receive, from at least one handheld controller that is communicatively coupled to the HMD, hand tracking data; and
modify, based at least in part on the hand tracking data, the pixel data to include one or more virtual hands overlaid on a scene represented by the pixel data to obtain the modified pixel data associated with the first frame.

5. The HMD of claim 1, wherein:
classifying the pixel data based at least in part on the depth data comprises classifying the pixel data as the foreground pixels, the background pixels, and a middle layer of pixels between the foreground pixels and the background pixels; and
applying the re-projection adjustments to the pixel data based at least in part on the depth data further comprises modifying the middle layer of pixels based at least in part on a third rate at which the re-projection adjustments are to be applied to the middle layer of pixels, the third rate being different than the first rate and the second rate.

6. The HMD of claim 1, wherein the computer-executable instructions, when executed by the processor, further cause the HMD to:
output the modified pixel data to a frame buffer,
wherein presenting the first image on the one or more display panels based at least in part on the modified pixel data comprises:
  scanning out the modified pixel data to the one or more display panels; and
  illuminating light emitting elements of the one or more display panels.

7. A method implemented by a head-mounted display (HMD) that includes one or more display panels having an array of light emitting elements, the method comprising:
sending, to a host computer, first head tracking data generated by a head tracking system of the HMD;
receiving, from the host computer, and based at least in part on the first head tracking data:
  pixel data associated with a first frame rendered at a frame rate by an application executing on the host computer; and
  extra data, the extra data including:
    pose data indicative of a predicted pose of the HMD that was used by the application to generate the pixel data; and
    depth data associated with the first frame;
determining, based at least in part on second head tracking data generated by the head tracking system, an updated pose that the HMD will be in at a time at which the light emitting elements will illuminate for the first frame;
classifying, based at least in part on the depth data, the pixel data as foreground pixels and background pixels;
applying, based at least in part on the depth data and a comparison between the predicted pose and the updated pose, re-projection adjustments to the pixel data to obtain modified pixel data associated with the first frame, wherein the applying of the re-projection adjustments to the pixel data based at least in part on the depth data comprises:
  modifying the foreground pixels based at least in part on a first rate at which the re-projection adjustments are to be applied to the foreground pixels; and
  modifying the background pixels based at least in part on a second rate at which the re-projection adjustments are to be applied to the background pixels, the second rate being less than the first rate and less than the frame rate; and
presenting a first image on the one or more display panels based at least in part on the modified pixel data.

8. The method of claim 7, wherein:
the host computer is wirelessly coupled to the HMD;
the first head tracking data is sent wirelessly to the host computer; and
the pixel data and the extra data are received wirelessly from the host computer.

9. The method of claim 7, further comprising:
receiving, from the host computer, second pixel data and second depth data associated with a second frame;
classifying, based at least in part on the second depth data, the second pixel data as second foreground pixels and second background pixels;
applying, based at least in part on the second depth data, second re-projection adjustments to the second pixel data to obtain second modified pixel data associated with the second frame, wherein the applying of the second re-projection adjustments to the second pixel data comprises:

modifying the second foreground pixels based at least in part on the first rate; and refraining from modifying the second background pixels based at least in part on the second rate; and presenting a second image on the one or more display panels based at least in part on the second modified pixel data.

10. The method of claim 7, further comprising:

receiving, from at least one handheld controller that is communicatively coupled to the HMD, hand tracking data; and modifying, based at least in part on the hand tracking data, the pixel data to include one or more virtual hands overlaid on a scene represented by the pixel data to obtain the modified pixel data associated with the first frame.

11. The method of claim 7, wherein:

the classifying of the pixel data based at least in part on the depth data comprises classifying the pixel data as the foreground pixels, the background pixels, and a middle layer of pixels between the foreground pixels and the background pixels; and the applying of the re-projection adjustments to the pixel data based at least in part on the depth data further comprises modifying the middle layer of pixels based at least in part on a third rate at which the re-projection adjustments are to be applied to the middle layer of pixels, the third rate being different than the first rate and the second rate.

12. A method implemented by a head-mounted display (HMD) that includes one or more display panels, the method comprising:

receiving, from a host computer, pixel data and depth data associated with a first frame rendered at a frame rate by an application executing on the host computer;

classifying, based at least in part on the depth data, the pixel data as foreground pixels and background pixels;

applying, based at least in part on the depth data, re-projection adjustments to the pixel data to obtain modified pixel data associated with the first frame, wherein the applying of the re-projection adjustments to the pixel data based at least in part on the depth data comprises:

modifying the foreground pixels based at least in part on a first rate at which the re-projection adjustments are to be applied to the foreground pixels; and modifying the background pixels based at least in part on a second rate at which the re-projection adjustments are to be applied to the background pixels, the second rate being less than the first rate and less than the frame rate; and presenting a first image on the one or more display panels based at least in part on the modified pixel data.

13. The method of claim 12, wherein the pixel data and the depth data are received wirelessly from the host computer.

14. The method of claim 12, further comprising:

receiving, from the host computer, second pixel data and second depth data associated with a second frame;

classifying, based at least in part on the second depth data, the second pixel data as second foreground pixels and second background pixels;

applying, based at least in part on the second depth data, second re-projection adjustments to the second pixel data to obtain second modified pixel data associated with the second frame, wherein the applying of the second re-projection adjustments to the second pixel data comprises:

modifying the second foreground pixels based at least in part on the first rate; and refraining from modifying the second background pixels based at least in part on the second rate; and presenting a second image on the one or more display panels based at least in part on the second modified pixel data.

15. The method of claim 12, further comprising:

receiving, from at least one handheld controller that is communicatively coupled to the HMD, hand tracking data; and modifying, based at least in part on the hand tracking data, the pixel data to include one or more virtual hands overlaid on a scene represented by the pixel data to obtain the modified pixel data associated with the first frame.

16. The method of claim 12, further comprising:

sending, to the host computer, first head tracking data generated by a head tracking system of the HMD, wherein the receiving of the pixel data associated with the first frame is based at least in part on the first head tracking data.

17. The method of claim 16, further comprising receiving, from the host computer, and based at least in part on the first head tracking data, pose data indicative of a predicted pose of the HMD that was used by the application to generate the pixel data; and determining, based at least in part on second head tracking data generated by the head tracking system, an updated pose that the HMD will be in at a time at which light emitting elements of the one or more display panels will illuminate for the first frame, wherein the applying of the re-projection adjustments to the pixel data is further based at least in part on a comparison between the predicted pose and the updated pose.

18. The method of claim 17, wherein the application comprises a video game.

19. The method of claim 12, wherein:

the classifying the pixel data based at least in part on the depth data comprises classifying the pixel data as the foreground pixels, the background pixels, and a middle layer of pixels between the foreground pixels and the background pixels; and the applying of the re-projection adjustments to the pixel data based at least in part on the depth data further comprises modifying the middle layer of pixels based at least in part on a third rate at which the re-projection adjustments are to be applied to the middle layer of pixels, the third rate being different than the first rate and the second rate.

20. The method of claim 12, further comprising:

outputting the modified pixel data to a frame buffer, wherein the presenting the first image on the one or more display panels based at least in part on the modified pixel data comprises:

scanning out the modified pixel data to the one or more display panels; and illuminating light emitting elements of the one or more display panels.

* * * * *